(12) United States Patent
Sakuma et al.

(10) Patent No.: US 10,423,269 B2
(45) Date of Patent: Sep. 24, 2019

(54) ELECTRONIC DEVICE AND CONTROL METHOD

(71) Applicant: KYOCERA Corporation, Kyoto (JP)

(72) Inventors: Manabu Sakuma, Yokohama (JP); Yudai Nagata, Kawasaki (JP); Masanori Morobishi, Yokohama (JP); Taro Iio, Yokohama (JP); Takayuki Fujiki, Hachioji (JP); Yuya Yamaguchi, Yokohama (JP); Makoto Honjo, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 253 days.

(21) Appl. No.: 15/251,309

(22) Filed: Aug. 30, 2016

(65) Prior Publication Data

US 2017/0060327 A1 Mar. 2, 2017

(30) Foreign Application Priority Data

Aug. 31, 2015 (JP) ................. 2015-170067
Mar. 29, 2016 (JP) ................. 2016-066239

(51) Int. Cl.
*G06F 3/041* (2006.01)
*G06F 3/044* (2006.01)
*G06F 1/16* (2006.01)

(52) U.S. Cl.
CPC .......... *G06F 3/0416* (2013.01); *G06F 1/1643* (2013.01); *G06F 1/1656* (2013.01); *G06F 1/1684* (2013.01); *G06F 3/044* (2013.01)

(58) Field of Classification Search
CPC .... G06F 3/0416; G06F 1/1643; G06F 1/1656; G06F 1/1684; G06F 3/044

USPC .................. 345/174; 248/917, 921
See application file for complete search history.

(56) References Cited

U.S. PATENT DOCUMENTS

| | | | |
|---|---|---|---|
| 8,477,120 B2 | 7/2013 | Jang et al. | |
| 9,292,137 B2 | 3/2016 | Kogo | |
| 9,830,035 B2 | 11/2017 | Kogo | |
| 2010/0253640 A1* | 10/2010 | Zhan | G06F 3/0416 345/173 |
| 2012/0182254 A1 | 7/2012 | Jang et al. | |
| 2013/0091553 A1* | 4/2013 | Eom | G06F 21/35 726/4 |
| 2013/0307821 A1 | 11/2013 | Kogo | |
| 2014/0340351 A1* | 11/2014 | Forlines | G06F 3/0416 345/174 |
| 2015/0022481 A1* | 1/2015 | Andersson | G06F 3/044 345/174 |

(Continued)

FOREIGN PATENT DOCUMENTS

JP 2012150783 A 8/2012
JP 2012-181771 A 9/2012
(Continued)

*Primary Examiner* — Amare Mengistu
*Assistant Examiner* — Gloryvid Figueroa-Gibson
(74) *Attorney, Agent, or Firm* — Studebaker & Brackett PC

(57) ABSTRACT

An electronic device is provided with a touch panel of a capacitive type and a controller. The controller, based on a detection value of the touch panel, detects capacitance generated between the touch panel and a contact object and detects, as a contact region, a first region having the capacitance smaller than a capacitance of the other region of the touch panel.

9 Claims, 13 Drawing Sheets

(56) References Cited

U.S. PATENT DOCUMENTS

| | | | |
|---|---|---|---|
| 2016/0004283 A1* | 1/2016 | Ganguly | G06F 1/1656 |
| | | | 307/118 |
| 2016/0202836 A1 | 7/2016 | Kogo | |
| 2016/0246396 A1* | 8/2016 | Dickinson | G06F 3/03545 |

FOREIGN PATENT DOCUMENTS

| JP | 2013-186501 A | 9/2013 |
|---|---|---|
| JP | 2013242699 A | 12/2013 |
| JP | 2014-171057 A | 9/2014 |

* cited by examiner

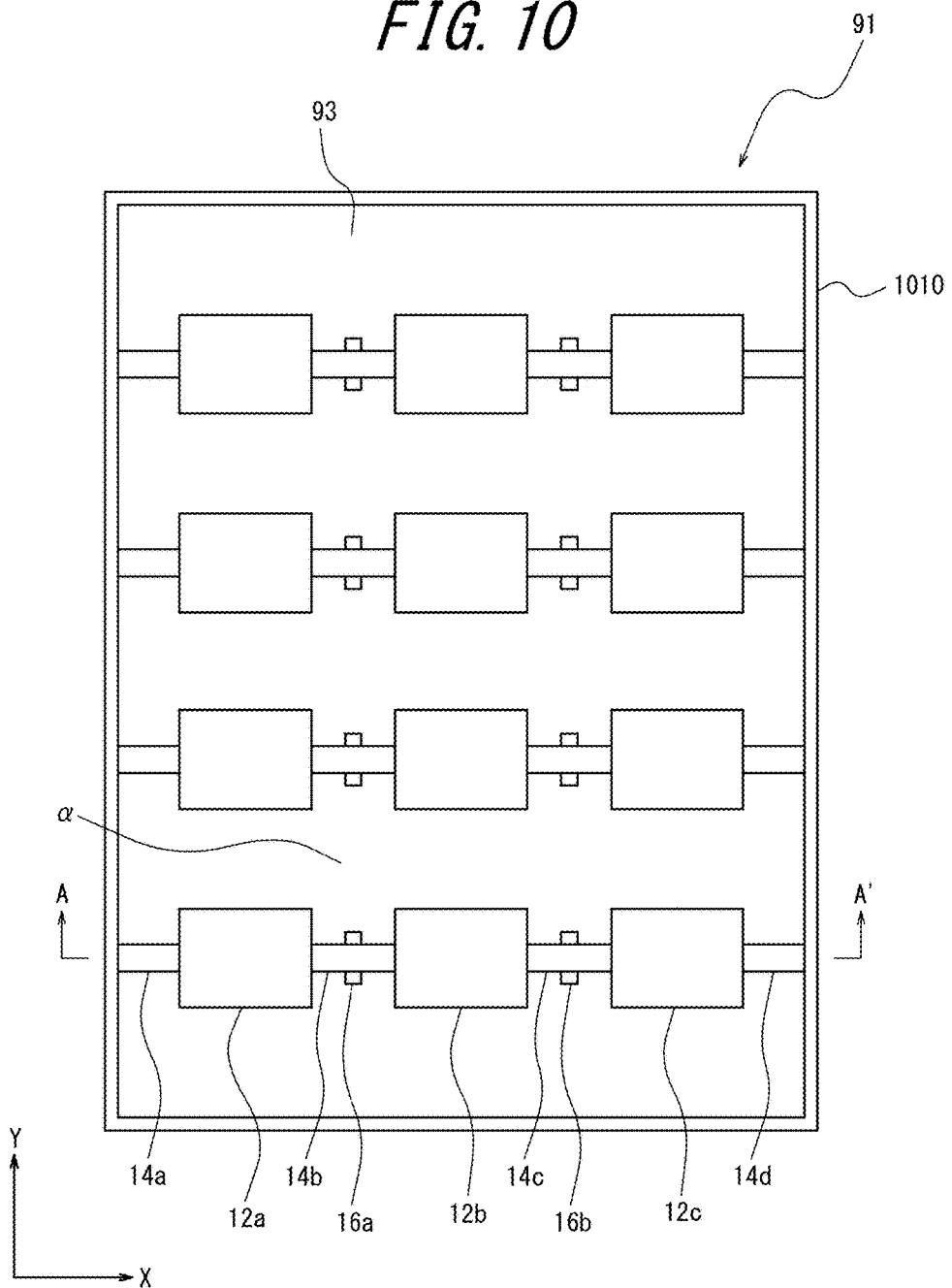

ELECTRONIC DEVICE AND CONTROL METHOD

FIELD

This disclosure relates to an electronic device and the like having a touch panel of a capacitive type.

BACKGROUND

There has been an electronic device having a touch panel of a capacitive type. When the touch panel of the capacitive type is touched, capacitance at a touched position changes due to static electricity. By utilizing this principle, the touch panel of the capacitive type may detect a touched position. Also, there has been suggested a technique to waterproof a body of an electronic device having a touch panel (e.g. see JP-A-2012-181771). Further, a touch panel configured to detect a touch point by employing different methods between when the touch panel is in the water and when the touch panel is not in the water has been suggested (e.g. see JP-A-2013-186501).

SUMMARY

An electronic device according to one embodiment includes a touch panel of a capacitive type and a controller. The controller, based on a detection value of the touch panel, detects capacitance generated between the touch panel and a contact object and detects, as a contact region of the contact object, a first region having capacitance smaller than that of the other region of the touch panel.

BRIEF DESCRIPTION OF THE DRAWINGS

In the accompanying drawings:

FIG. 10 is an external view of the electronic device

DETAILED DESCRIPTION

Figure 1:
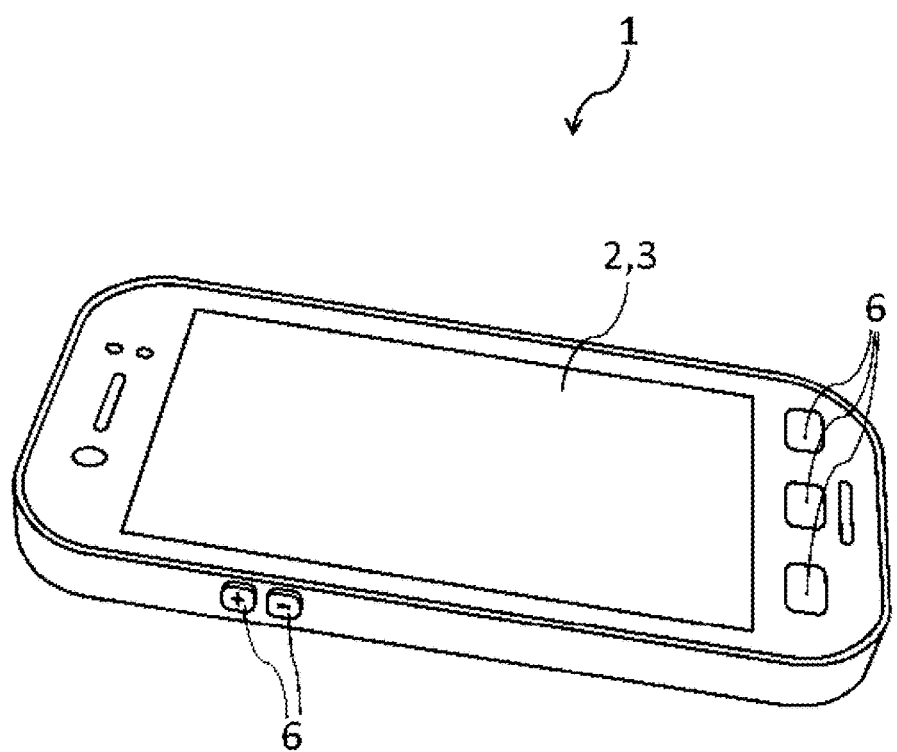
FIG. 1 is a perspective view of an appearance of an electronic device.

An embodiment of the disclosure herein will be described in detail with reference to the drawings. In the following description, the same constituents may be denoted by the same reference numerals. Also, overlapping descriptions may be omitted. Note that the following description does not limit the disclosure herein. Further, the constituents in the following description include those easily conceived by those who are skilled in the art, those substantially identical to one another, and those in what is called an equivalent range.

When a touch panel of an electronic device may be used in a state in which the touch panel is covered with the water, or in a state in which a body of the electronic device is in the water, usage of the electronic device may be expanded. However, providing a touch detection mechanism of a resistive film type in order to detect a touch point in the water complicates a configuration. The embodiment described below discloses an electronic device having a touch panel of a capacitive type allowing a touch operation in the water, and a control method. Providing such a touch panel expands the usage of the electronic device.

FIG. 1 is a perspective view of an appearance of an electronic device 1. As illustrated in FIG. 1, the electronic device 1 is what is called a smartphone having a housing, a display 2, a touch panel 3, and buttons 6.

Although in an example of FIG. 1 the display 2 and the touch panel 3 have substantially rectangular shapes, shapes of the display 2 and the touch panel 3 are not limited thereto. The display 2 and the touch panel 3 may have any shape including a square shape, a circular shape, a curved shape, and the like. Although in the example of FIG. 1 the display 2 and the touch panel 3 are disposed overlapping with each other, arrangements thereof are not limited thereto. For example, the display 2 and the touch panel 3 may be arranged side by side in such a manner that surfaces thereof do not overlap with each other, or the display 2 and the touch panel 3 may be arranged having a space therebetween. Although in the example of FIG. 1 a long side of the display 2 is parallel to a long side of the touch panel 3 while a short side of the display 2 is parallel to a short side of the touch panel 3, an overlapping manner of the display 2 and the touch panel 3 is not limited thereto. When the display 2 and the touch panel 3 are arranged overlapping with each other, for example, the display 2 may have one or a plurality of sides which are not parallel to any side of the touch panel 3.

The electronic device 1 determines a type of a gesture based on at least one of contact with the touch panel 3, a contact position, a change in the contact position, the number of times of the contact, and intervals between a plurality of contacts (hereinafter, those may be collectively referred to as a contact mode). The gesture is an operation performed to the touch panel 3. The gesture determined by the electronic device 1 includes, for example, touch, long touch, release, swipe, tap, double tap, long tap, flick, pinch-in, and pinch-out but is not limited thereto. The electronic device 1 executes a predetermined operation based on a determined gesture. Therefore, an intuitive and easy-to-use operation for a user may be substantialized.

The housing of the electronic device 1 has a sealing structure. The housing forms a space therein which, with the sealing structure, prevents the water from entering the space. The electronic device 1, in order to substantialize the sealing structure, closes an opening formed on the housing with a functional member which allows ventilation while preventing fluid to pass therethrough, a cap, and the like. Such a functional member which allows ventilation while preventing the fluid to pass therethrough may be substantialized by using, for example, Gore-Tex® (Gore-Tex is a registered trademark in Japan, other countries, or both), Drytec, eVent, BERGTECH, HyventD, and the like. According to the present embodiment, the housing is provided with at least the touch panel 3 and the buttons 6. In this case, the electronic device 1 prevents the water from entering a gap between the housing and the touch panel 3, and a gap between the housing and the buttons 6, with the functional member or the like which allows ventilation while preventing fluid to pass therethrough. Having the sealing structure, the electronic device 1 may be used in wet areas or in the water.

Figure 2:
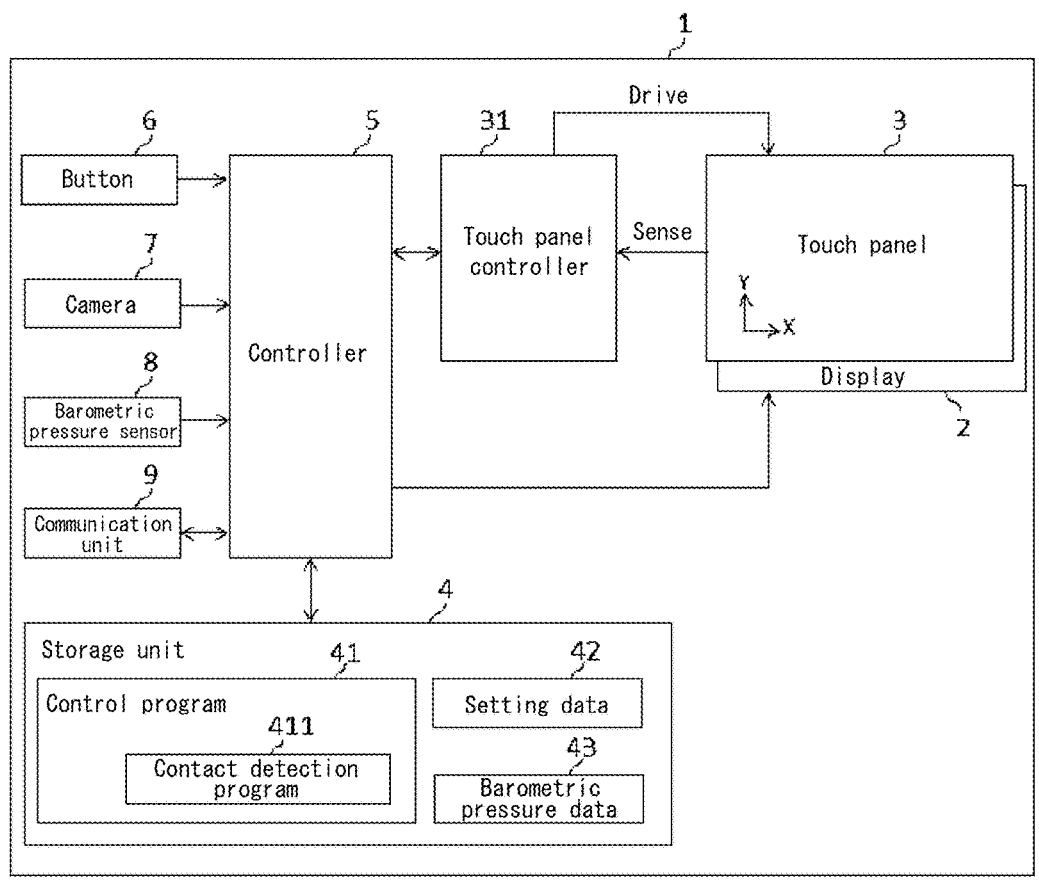
FIG. 2 is a block diagram of the electronic device.

FIG. 2 is a block diagram of the electronic device 1. The electronic device 1 includes the display 2, the touch panel 3, a touch panel controller 31, a storage unit 4, a controller 5, the button 6, a camera 7, a barometric pressure sensor 8, and a communication unit 9.

The display 2 includes a display device such as a liquid crystal display (LCD: Liquid Crystal Display), an organic electroluminescence display (OELD: Organic Electro-Luminescence Display), an inorganic EL display (IELD: Inorganic Electro-Luminescence Display), or the like. The display 2 displays characters, images, symbols, shapes, and the like. The display 2 displays the characters, the images, the symbols, the shapes, and the like based on an image signal output from the controller 5.

The touch panel 3 has an X-axis line in which transparent electrode groups disposed in a line in an X-axis direction are connected in series and a Y-axis line in which transparent electrode groups disposed in a line in a Y-axis direction are connected in series. The touch panel 3 is provided with a plurality of X-axis lines arranged in parallel to one another in the Y-axis direction and a plurality of Y-axis lines arranged in parallel to one another in the X-axis direction. The plurality of X-axis lines and the plurality of Y-axis lines are connected to the touch panel controller 31.

The touch panel controller 31 periodically applies a driving voltage (Drive) to each of the Y-axis lines and detects (Scan) a potential of each of the X-axis lines each time of the application. The potential detected here may be referred to as a detection value of the touch panel 3. The touch panel controller 31 outputs the potential detected at each position of the touch panel 3 (the detection value of the touch panel 3) to the controller 5.

The storage unit 4 may store a program and data. The storage unit 4 may be used as a working area for temporarily storing a processing result of the controller 5. The storage unit 4 includes a recording medium. The recording medium may include a semiconductor recording medium and any non-transitory storage medium such as a magnetic storage medium. The storage unit 4 may include storage media of a plurality of types. The storage unit 4 may include a combination of a portable storage medium such as a memory card, an optical disk, a magneto-optical disk, and the like and a storage medium reader. The storage unit 4 may include a storage device used as a temporary storage region such as RAM (Random Access Memory) and the like.

The storage unit 4 stores at least a control program for providing functions of various controls to operate the electronic device 1, setting data 42, and barometric pressure data 43. The control program 41 includes a contact detection program 411 for offering a function to detect contact with the touch panel 3 based on the detection value of the touch panel 3. Also, the contact detection program 411 offers a function to detect the type of the gesture performed to the touch panel 3 based on the contact mode to the touch panel 3. The control program 41 offers a function to perform, based on the gesture performed to the touch panel 3, various controls including changing information displayed in the display 2.

Also, the control program 41 may offer a function to determine whether the electronic device 1 (an device of its own) is in the water. The control program 41 may refer to the setting data 42 and, based on the detection value of the touch panel 3, determine whether the electronic device 1 is in the water. In this case, the setting data 42 may include condition data used for the presuming whether the electronic device 1 is in the water based on a distribution of capacitance of the touch panel 3 detected based on the detection value of the touch panel 3. Or, the setting data 42 may include, as the condition data, the detection value of the touch panel 3 which allows the presuming that the electronic device 1 is in the water and the detection value of the touch panel 3 which allows the presuming that the electronic device 1 is not in the water. Or, the setting data 42 may include, as the condition data, a changing condition of the detection value of the touch panel 3 which allows the presuming that the electronic device 1 is shifted from a state in which the electronic device 1 is not in the water to a state in which the electronic device 1 is in the water.

Also, the control program 41 may refer to the barometric pressure data 43 in place of the setting data 42 and, based on a detection value of the barometric pressure sensor 8, determine whether the electronic device 1 is in the water. The barometric pressure data 43 include information about a relation between a detection result of the barometric pressure sensor 8 and the state of the electronic device 1. The barometric pressure data 43 stores the information about the relation between the detection result of the barometric pressure sensor 8 and the state whether the electronic device 1 is in the water, preliminarily acquired through examinations or simulations.

The controller 5 is an arithmetic processing device. The arithmetic processing device includes, for example, CPU (Central Processing Unit), SoC (System-on-a-chip), MCU (Micro Control Unit), and FPGA (Field-Programmable Gate Array) but is not limited thereto. The controller 5 controls overall operations of the electronic device 1, thereby substantializing various functions. [0020] For example, the controller 5, by referencing to the data stored in the storage unit 4 as necessary, executes instructions included in the program stored in the storage unit 4. Then, the controller 5 controls a functional unit in accordance with the data and the instruction, thereby substantializing various functions. The functional unit may include, for example, at least one of the display 2 and the communication unit 9 but is not limited thereto. Also, the controller 5 changes the control based on, for example, a detection result of the button 6, the camera 7, the barometric pressure sensor 8, or the like.

The controller 5 executes the contact detection program 411 and, based on the detection value of the touch panel 3 output from the touch panel controller 31, detects the capacitance of the touch panel 3. The controller 5 detects capacitance (hereinafter, also referred to as first capacitance) generated due to the application of the driving voltage executed by the touch panel controller 31 between one transparent electrode (a first electrode) constituting the Y-axis line of the touch panel 3 and another transparent electrode (a second electrode) constituting the X-axis line. Then, the controller 5, based on the first capacitance generated between the first electrode and the second electrode, calculates capacitance (hereinafter, also referred to as second capacitance) generated between the touch panel 3 and a contact object. Here, when the second capacitance generated between the touch panel 3 and the contact object increases, the first capacitance generated between the first electrode and the second electrode decreases. In other words, when the controller 5 detects larger first capacitance, the controller 5 simultaneously detects smaller second capacitance. The controller 5, based on the detection value corresponding to each transparent electrode of the touch panel 3 output from the touch panel controller 31, detects, as a contact region, a region having the second capacitance larger than the other region of the touch panel 3. Or, the controller 5 may detect, as the contact region, a region of the touch panel 3 having the second capacitance equal to or larger than a predetermined value.

The electronic device 1, as described above, by using a detection method (referred to as a first detection method) of the capacitance type (especially, a projection-capacitance type) as described above, may detect contact with the touch panel 3 made by the contact object (a finger, a pen, a stylus pen, and the like). However, when the electronic device 1 is in the water, there may be cases that the first detection method cannot detect the contact with the touch panel 3 made by the contact object.

As such, in the electronic device 1 of the present embodiment, in a manner different from the first detection method, the controller 5 is configured to detect, as the contact region, a region (a first region) having the second capacitance smaller than the capacitance of the other region of the touch panel 3. Alternatively, in the electronic device 1 of the present embodiment, the controller 5 may be configured to detect, as the contact region of the contact object, the region (the first region) of the touch panel 3 having the second capacitance equal to or smaller than a predetermined value. Each of these configurations is referred to as a second detection method.

An electronic device, when executing the first detection method may detect, as a contact position, a position where the second capacitance increases, based on an increase in the second capacitance on the basis of the contact with the touch panel made by a predetermined object (i.e., an object which easily performs capacitive coupling with the touch panel). When such an electronic device is in the water, for example, since the surface of the touch panel 3 is entirely exposed to water, the second capacitance at various positions of the surface uniformly increases by the capacitive coupling with the water. Therefore, when the predetermined object having high relative permittivity contacts with the touch panel in the water, the increase in the second capacitance caused by the contact cannot be detected, and thus the contact position cannot be detected.

The electronic device 1 according to the present embodiment has the second detection method as described above, when the predetermined object made of a material having the relative permittivity lower than that of the water ($\varepsilon r$=80.4) is brought into contact with the touch panel 3, a region may be generated which is less likely to cause the capacitive coupling between the touch panel 3 and water than the other region with which the predetermined object is not in contact (i.e., the water is less likely to contact with the region in which the touch panel 3 and the predetermined object are in contact with each other). Therefore, this area may be detected as the region (the first region) having the second capacitance smaller than the capacitance of the other region of the touch panel 3, or as the region (the first region) having the second capacitance of the touch panel 3 equal to or smaller than a first predetermined value, i.e., as the contact region. That is, the electronic device 1 according to the present embodiment has the second detection method as described above and therefore, even when the electronic device 1 is of the capacitive type, allows the touch operation in the water.

The controller 5, based on the contact mode detected by the first detection method or the second detection method, detects the type of the gesture performed to the touch panel 3. The controller 5, by executing the control program 41, based on the type of the gesture performed to the touch panel 3, executes various controls including changing the information displayed in the display 2. Note that the electronic device 1 according to the present embodiment may have the second detection method alone without the first detection method, i.e., may allow the touch operation in the water alone.

The button 6 is operated by the user. The controller 5, by cooperating with the buttons 6, detects an operation performed to the buttons 6. The operation performed to the buttons 6 includes, for example, pressing once or pressing a plurality of times but is not limited thereto.

The camera 7 is disposed, for example, on a surface of the electronic device 1 opposite to another surface having the display 2 disposed thereon and captures an object facing the surface. The camera 7 electronically captures an image by using an image sensor such as CCD (Charge Coupled Device Image Sensor), CMOS (Complementary Metal Oxide Semiconductor), and the like. Then, the camera 7 converts a captured image into a signal and transmits the signal to the controller 5.

The barometric pressure sensor 8 detects a barometric pressure (atmospheric pressure) outside of the electronic device 1. Since the barometric pressure sensor 8 is disposed in the housing of the electronic device 1 having the structure that, through the opening which allows ventilation, the barometric pressure inside of the housing and the barometric pressure outside of the housing are linked to each other (while holding back the water), the barometric pressure sensor 8 may detect the barometric pressure outside of the electronic device 1. The barometric pressure sensor 8 transmits a detection result to the controller 5.

The communication unit 9 may perform a radio communication. The communication unit 9 may support a short distance radio communication system. The short distance radio communication system includes Bluetooth® (Bluetooth is a registered trademark in Japan, other countries, or both), wireless LAN (IEEE802.11), ZigBee® (ZigBee is a registered trademark in Japan, other countries, or both), an infrared communication, a visible light communication, NFC (Near Field Communication), and the like. The communication unit 9 may support a plurality of communication systems. The communication unit 9 may support, for example, a communication standard of a cellular phone such as 2G, 3G, and 4G. The communication unit 9 may support a wired communication. The wired communication includes, for example, Ethernet® (Ethernet is a registered trademark in Japan, other countries, or both), Fibre Channel, and the like.

Some of or all of the program and the data stored in the storage unit 4 in FIG. 2 may be downloaded from another device via the communication performed by the communication unit 9. Or, some of or all of the program and the data stored in the storage unit 4 in FIG. 2 may be stored in the non-transient storage medium readable by the reader included in the storage unit 4. Or, some or all of the program and the data stored in the storage unit 4 in FIG. 2 may be stored in the non-transient storage medium readable by a reader connected to a connector provided to the electronic device 1. The non-transient storage medium includes, for example, the optical disk such as CD® (CD is a registered trademark in Japan, other countries, or both), DVD® (DVD is a registered trademark in Japan, other countries, or both), and Blu-ray® (Blu-ray is a registered trademark in Japan, other countries, or both), the magneto optical disk, the magnetic storage medium, the memory card, and a solid state storage medium but is not limited thereto.

Figure 3:
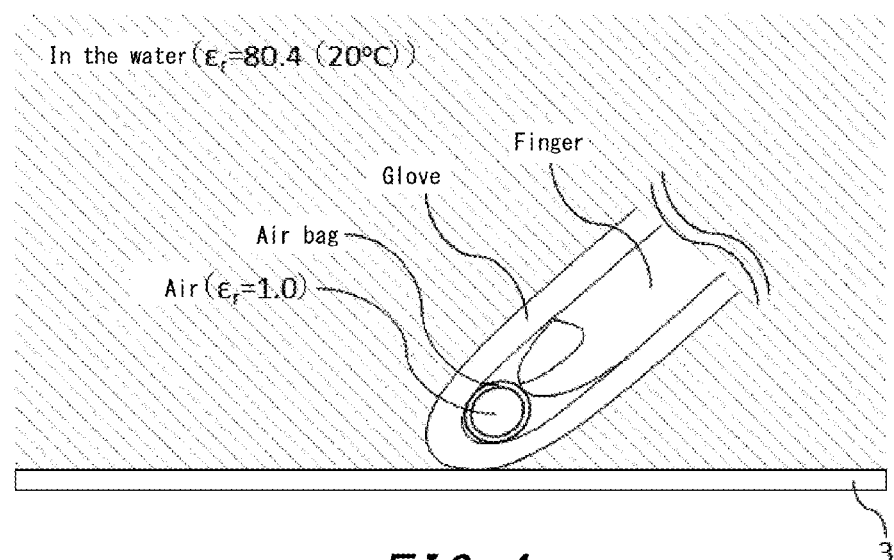
FIG. 3 is a diagram illustrating an outline of an experiment to perform a touch operation in the water.
Figure 4:
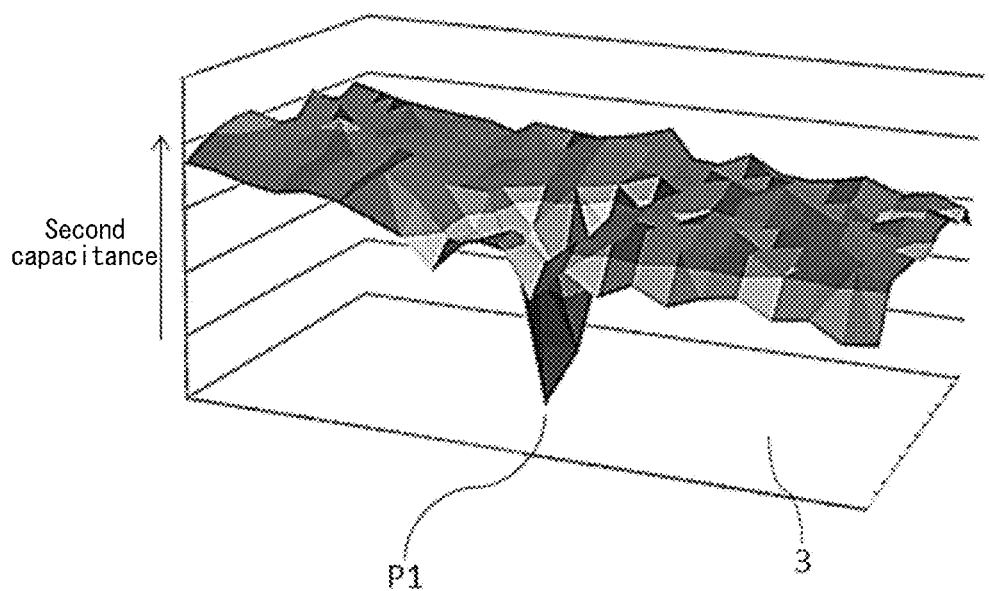
FIG. 4 is a diagram illustrating a distribution of capacitance when the touch operation is performed to the electronic device in the water.

As described above, the electronic device 1 according to the present embodiment, by executing the second detection method, allows the touch operation in the water when the predetermined object made of the material having the relative permittivity lower than that of the water (εr=80.4) contacts with the touch panel 3. We conducted an experiment by bringing the predetermined object made of the material having the relative permittivity lower than that of the water (εr=80.4) into contact with the touch panel 3 of the electronic device 1 and, from a result of the experiment, found that the touch operation is allowed in the water. FIG. 3 is a diagram illustrating an outline of the experiment to perform the touch operation in the water. FIG. 4 is a diagram illustrating a distribution of the second capacitance when the touch operation was performed in the water.

As illustrated in FIG. 3, a conductor of the experiment wore a rubber glove, as a glove made of the material having the relative permittivity lower than that of the water, in a manner having an air bag between the glove and the tip of the conductor's finger inside the rubber glove. The distribution of the second capacitance when the conductor touched the touch panel 3 of the electronic device 1 under such a condition is as illustrated in FIG. 4, in which a peak position P1 having the capacitance lower than that of the other region was observed. A difference between the second capacitance at the peak position P1 and the second capacitance of the other region is sufficiently large to allow distinguishing the peak position from the other region, and thus it was found that the touch operation performed in the water may be detected. The contact region where the rubber glove contacts with the touch panel 3 is unlikely to allow the water to contact therewith and, further, unlikely to have the capacitive coupling with the tip of the conductor's finger. Therefore, when the driving voltage is applied by the touch panel controller 31, surface charge formed on the touch panel 3 is unlikely to disperse in the water.

Here, when the touch operation is performed to the touch panel in the atmosphere (i.e., in normal operation), on a basis of that, since an object (e.g., the finger) having the relative permittivity higher than that of the air contacts with the touch panel, the capacitive coupling between the finger and the touch panel is caused at the contact position and the second capacitance is increased to be larger than the other region with which the contact object is not in contact, the contact position is detected (the first detection method). That is, since the first detection method detects an upper peak (in a direction opposite to the peak P1) in FIG. 3 as the contact position, it should be understood that the first detection method is completely different from the configuration of the electronic device 1 according to the present embodiment.

Note that, as illustrated in FIG. 3, as an experiment condition of the touch operation in the water, the conductor performed the touch operation wearing the rubber glove having the air bag between the robber glove and the fingertip inside the rubber glove. However, it is not necessarily required to have the air bag between the conductor's fingertip and the rubber glove inside the rubber glove but, for example, the glove may have a thickness enough to prevent the capacitive coupling between the touch panel and the conductor's finger when the conductor wears the glove and contacts with the touch panel. Also, the material of the glove is not limited to a rubber material but may be any material so long as having the relative permittivity lower than that of the water. Further, in place of the glove in shape covering from the conductor's fingertip to a vicinity of the wrist, a fingerstall for covering, in a shielding manner, from the tip of a particular finger used to perform the touch operation to a portion several centimeters therefrom may be used.

Figure 5:
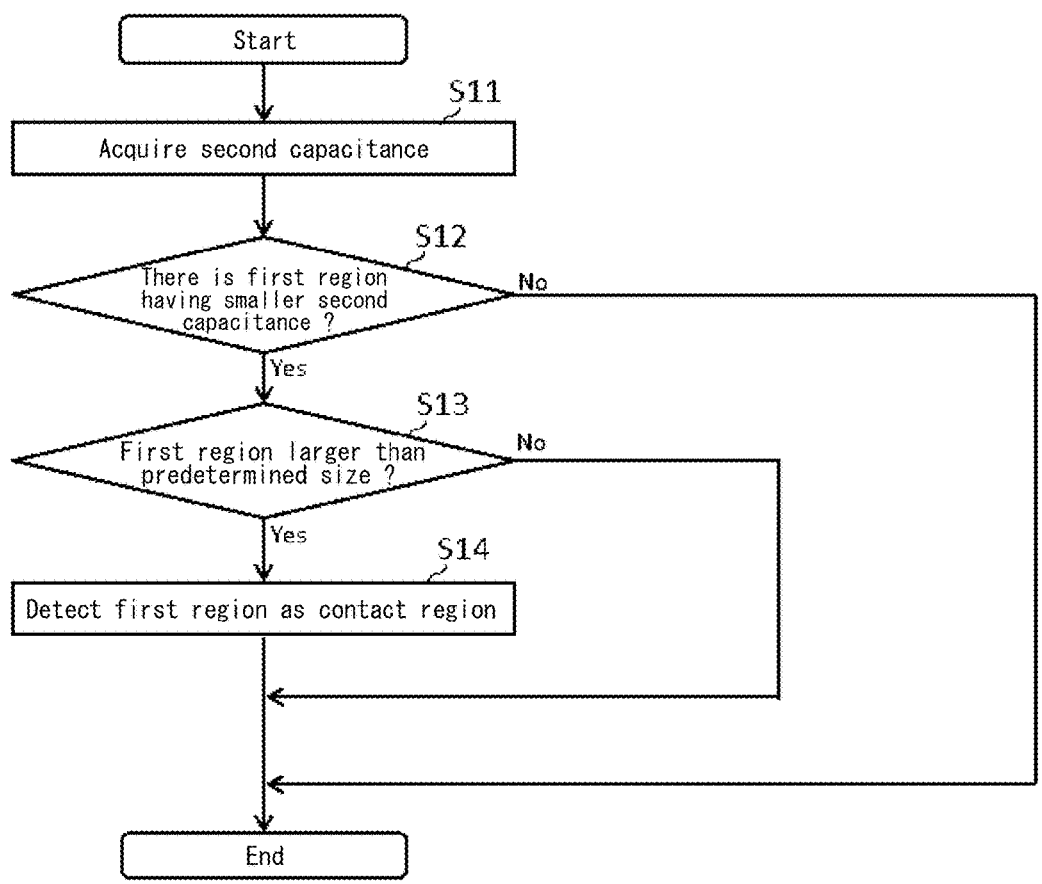
FIG. 5 is a flowchart illustrating an example of a function executed by the electronic device.

Referring to FIG. 5, next, a function executed by the electronic device 1 will be described. FIG. 5 is a flowchart illustrating an example of the function executed by the electronic device 1 according to the present embodiment. The electronic device 1, by controlling the controller 5 to execute the control program 41 stored in the storage unit 4, may substantialize the function illustrated in FIG. 5. The example illustrated in FIG. 5 describes, on the assumption that the electronic device 1 is in the water, a case in which the touch operation is performed by using the second detection method.

At step S11, the controller 5 of the electronic device 1, based on the detection value of the touch panel 3 output from the touch panel controller 31, acquires the second capacitance (the capacitance generated between the touch panel 3 and the contact object) corresponding to each position of the touch panel 3.

At step S12, the controller 5, after acquiring the second capacitance, determines whether there is a region (the first region) having the second capacitance smaller than the capacitance of the other region of the touch panel 3. The controller 5, when determining that the first region is not present (No at step S12), ends the operation. The controller 5, when determining that there is the first region (Yes at step S12), proceeds to step S13.

At step S13, the controller 5 determines whether the first region is larger than a predetermined size. Here, the predetermined size may be approximately in size (for example, 5 mm square) allowing determination that the user's finger as the contact object contacts with the touch panel 3. The controller 5, when determines that the first region is smaller than the predetermined size (No at step S12), does not detect the first region as the contact region (i.e., invalidates the detection of the first region) and ends the operation. The controller 5, when determines that the first region is larger than the predetermined size (Yes at step S13), proceeds to step S14 and detects the first region as the contact region externally contacted. The controller 5, based on the detection of the external contact, determines the type of the gesture from the contact mode and executes predetermined processing in accordance with the gesture. The controller 5 executes the predetermined processing and then ends the operation.

Although in the example illustrated in FIG. 5 the controller 5 is configured to detect the region having the second capacitance smaller than the capacitance of the other region of the touch panel 3 as the first region, the configuration of the controller 5 is not limited thereto. The controller 5 may be configured to detect the region of the touch panel 3 having the second capacitance equal to or smaller than the first predetermined value as the first region.

As described above, in the electronic device 1 according to the present embodiment, the controller 5 may determine that the first region detected smaller than the predetermined size is not the contact region but the first region larger than the predetermined size is the contact region.

In the water there are numerous electric charges in a state in which the electric charges are capable of moving freely. Therefore, when such electric charges come close to a surface of the touch panel 3 of the electronic device 1, a localized region is formed in which the first capacitance is considered to have increased due to the electric charges. Since the region in which the first capacitance increases is a region in which the second capacitance decreases, such a localized region may be erroneously detected as the contact region by the second detection method.

Figure 6:
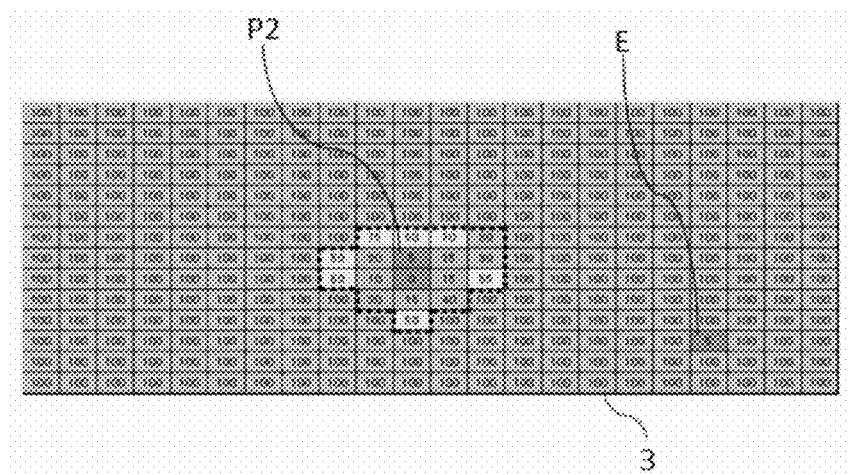
FIG. 6 is a diagram illustrating the capacitance detected in each unit detection area of the touch panel represented by a value.

FIG. 6 is a diagram illustrating values representing the second capacitance detected in each unit detection region of the touch panel 3 when the experiment illustrated in FIG. 3 is conducted. The entire region illustrated in FIG. 6 corresponds to the surface of the touch panel 3. As illustrated in FIG. 6, a region P2 (a region surrounded by doted lines) formed by a plurality of unit detection regions having the second capacitance smaller than the capacitance of the other region of the touch panel 3 connected in the X-axis direction and the Y-axis direction and a region E formed by a single unit detection region having the second capacitance smaller than the capacitance of the other region of the touch panel 3 are detected as the first region. The region P2 is approximately in size (e.g. larger than 5 mm square) allowing the determination that the user's finger as the contact object contacts with the touch panel 3. On the other hand, the region E is in size (e.g. smaller than 5 mm square) to be considered as the localized region caused by the electric charges moving freely in the water. Therefore, as described above, since the first region detected smaller than the predetermined size (the region E) is determined as not the contact region while determining the first region (the region P2) detected larger than the predetermined size as the contact region, an erroneous detection of the contact region based on a change in the second capacitance caused by the electric charges moving freely in the water may be prevented.

Although the embodiment described above illustrates the electronic device 1 for detecting the contact made by the contact object by employing a mutual capacitance method of the projection-capacitance type, the detection method is not limited thereto but may be a self-capacitance method or a dual method combining the self-capacitance method and the mutual capacitance method.

Figure 7:
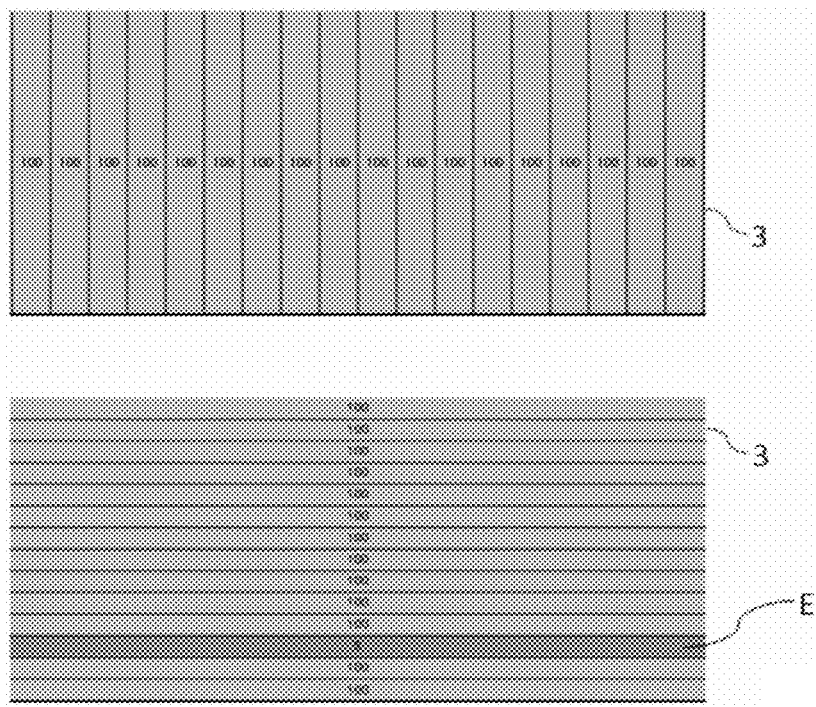
FIG. 7 is a diagram illustrating a detection result in applying a self-capacitance system.

Note that, since the self-capacitance method is a method of using one transparent electrode constituting any one of the X-axis line and the Y-axis line as a sense electrode and thus detecting the capacitance generated between the sense electrode and its surroundings, the controller 5, as illustrated in FIG. 7, detects the capacitance of each of a plurality of X-axis lines and a plurality of Y-axis lines. Therefore, the controller 5, based on whether one or a plurality of X-axis lines, among the plurality of X-axis lines, having the second capacitance smaller than the capacitance of the other lines and one or a plurality of Y-axis lines, among the plurality of Y-axis lines, having the second capacitance smaller than the capacitance of the other lines are detected, may determine whether the first region having the second capacitance smaller than the capacitance of the other region of the touch panel 3 is generated by the contact object such as the finger or by the electric charges moving freely in the water. Or, the controller 5, based on whether one or a plurality of X-axis lines, among the plurality of X-axis lines, having the second capacitance equal to or smaller than the predetermined value and one or a plurality of Y-axis lines, among the plurality of Y-axis lines, having second capacitance equal to or smaller than the predetermined value are detected, may determine whether the first region of the touch panel 3 having the second capacitance equal to or smaller than the predetermined value is generated by the contact object such as the finger or caused by the electric charges moving freely in the water. That is, in the electronic device 1 according to the present embodiment, the touch panel 3 includes a first electrode group (the plurality of X-axis lines) arranged in a first direction and a second electrode group (the plurality of Y-axis lines) arranged in a second direction orthogonal to the first direction. When the first region is detected in any one of the first electrode group and the second electrode group (the X-axis line in the example of FIG. 7), the controller 5 (a control unit) determines that the first region is a region (a region denoted by E in the example of FIG. 7) in which the second capacitance is locally changed by the electric charges moving freely in the water and thus the first region is not the contact region generated by a user operation. On the other hand, when the first region is detected in both the first electrode group and the second electrode group, the controller 5 detects the first region as the contact region generated by the user operation.

The procedure executed by the controller 5 of the electronic device 1 described with reference to FIG. 5 assumes that the electronic device 1 is in the water and thus the touch operation is performed by using the second detection method. However, the procedure is not limited thereto but may determine whether the electronic device 1 is in the water, and detect the touch by using the first detection method when the electronic device 1 is not in the water, or detect the touch by using the second detection method when the electronic device 1 is in the water. In this case, the controller 5, as described above, may refer to the setting data 42 and, based on the detection value of the touch panel 3, determine whether the electronic device 1 (the device of its own) is in the water, or may refer to the barometric pressure data and, based on the detection result of the barometric pressure sensor, determine whether the electronic device 1 (the device of its own) is in the water.

In this way, the controller 5 (the control unit) of the electronic device 1 determines whether the device of its own is in the water and, when the device of its own is in the water, employs the second detection method and thus detects, as the contact region, the region (the first region) having the capacitance (the second capacitance) smaller than the capacitance of the other region of the touch panel 3. On the other hand, when the device of its own is not in the water, the controller 5 employs the first detection method and thus detects, as the contact region, the region (referred to as a second region) having the capacitance (the second capacitance) larger than the capacitance of the other region of the touch panel 3.

Or, the controller 5 (the control unit) of the electronic device 1 determines whether the device of its own is in the water and, when the device of its own is in the water, employs the second detection method and thus detects, as the contact region, the region (the first region) having the capacitance (the second capacitance) equal to or smaller than the predetermined value (the first predetermined value). On the other hand, when the device of its own is not in the water, the controller 5 employs the first detection method and thus detects, as the contact region, the region (referred to as the second region) having the capacitance (the second capacitance) equal to or larger than the predetermined value (a second predetermined value).

Figure 8:
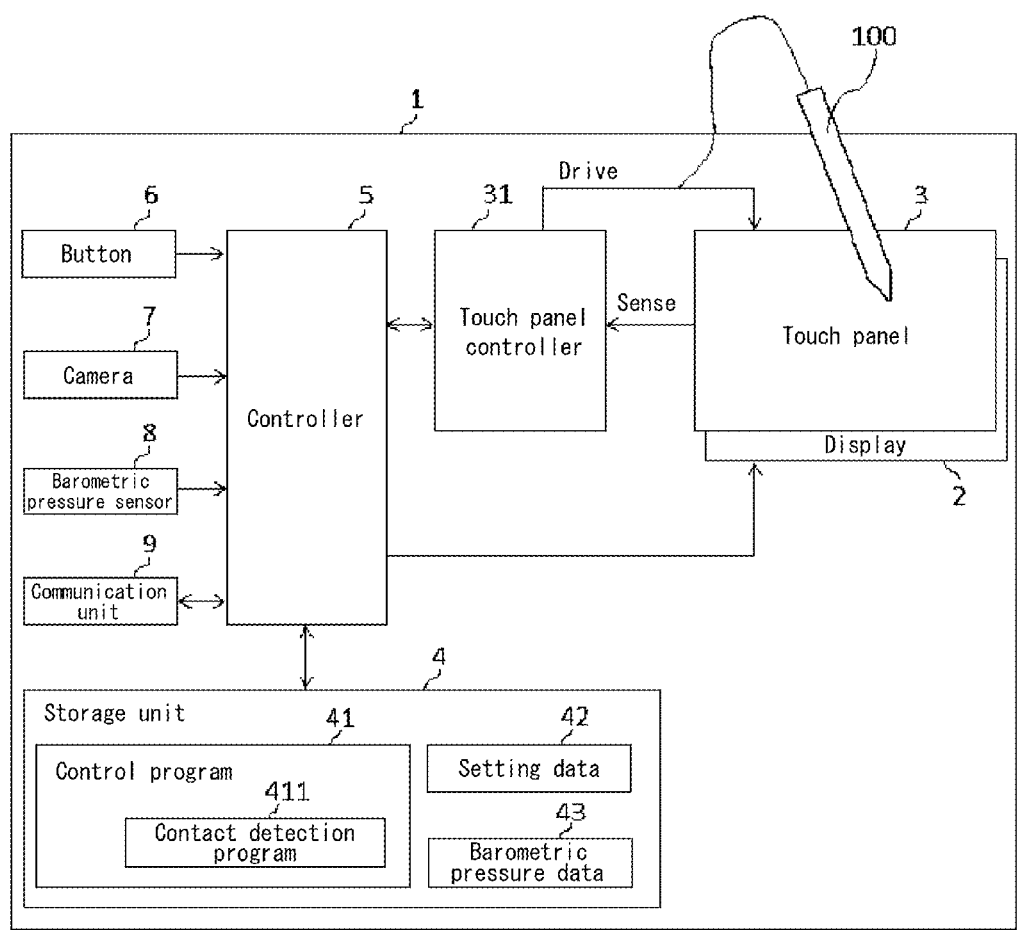
FIG. 8 is a block diagram of an electronic device 1 according to another example.

FIG. 8 is a block diagram of the electronic device 1 according to another example of the present embodiment. Descriptions of functional units denoted by the same reference numerals of the block diagram of the electronic device 1 illustrated in FIG. 2 will be omitted. As illustrated in FIG. 8, the electronic device 1 includes a stylus pen 100. The following is a description of an example in which the electronic device 1 detects the contact by using the mutual capacitance method.

The stylus pen 100 is electrically connected to the touch panel controller 31. Being electrically connected to the touch panel controller 31, the stylus pen 100 receives power supply therefrom. By using supplied power as a power source, the stylus pen 100 may externally emit (discharge) the electric charge from a tip thereof.

The controller 5, as described above, based on the detection value of the touch panel 3 output from the touch panel controller 31, may detect the first capacitance of the touch panel 3 (the capacitance between the first electrode and the second electrode of the touch panel 3). When the electronic device 1 is in the water and the electric charge is discharged in a state in which the tip of the stylus pen 100 is in contact with the touch panel 3, at a contact position of the tip of the stylus pen 100 in the touch panel 3, the first capacitance larger than the other region is detected by the controller 5. In a state in which the electronic device 1 is in the water, since the surface of the touch panel 3 in its entity performs the capacitive coupling with the water, the first capacitance at each position of the surface uniformly decreases. However, at the contact position of the tip of the stylus pen 100 in the touch panel 3, due to the electric charges supplied from the stylus pen 100, the first capacitance further larger than that of the other region of the touch panel 3 is detected by the controller 5. That is, the electric charges supplied from the stylus pen 100 simulatively generate a region in which the first capacitance is increased.

As described above, the electronic device 1 according to the present embodiment further includes the stylus pen 100 (a discharge unit) capable of externally discharging. Thereby, in the contact region of the tip of the stylus pen 100 in the touch panel 3, the first capacitance larger than that of the other region is detected by the controller 5. As described above, since the controller 5 detects the larger first capacitance and, simultaneously, the smaller second capacitance, the controller 5 may detect, by using the second detection method, the touch operation performed in the water. Note that the present embodiment is not limited to the configuration in which the stylus pen 100 (the discharge unit) is electrically connected to the touch panel controller 31 and receives power supply therefrom, but the stylus pen 100 may be connected to another functional unit of the electronic device 1 to receive power supply therefrom. Or, the stylus pen 100 (the discharge unit) may include a power source therein and discharge without being connected to the functional unit of the electronic device 1. Further, although the configuration in which the stylus pen 100 discharges while being in contact with the touch panel 3 and thus the contact of the stylus pen 100 is detected is described, this is not restrictive. When the stylus pen 100 discharges near the touch panel 3, based on an increase in the electric charges in the vicinity of the tip of the stylus pen 100, an increase in the first capacitance is detected.

In the above embodiment, the stylus pen 100 (the discharge unit) externally supplies the electric charges and generates the region of the touch panel 3 having the first capacitance increased, whereby the touch operation performed in the water using the second detection method may be enabled. However, the contact object is not limited to one capable of externally discharging. The contact object may be made of, for example, a piezoelectric material. The contact object made of the piezoelectric material, when contacts with the touch panel 3, deforms due to the contact and generates an electrical signal, thereby increasing the first capacitance of the contact region in the touch panel 3.

The piezoelectric material may be, for example, piezoelectric ceramics having a perovskite structure represented by lead zirconate titanate, or a piezoelectric polymer represented by polyvinylidene fluoride. When the piezoelectric material is the piezoelectric ceramics, the contact object may be, for example, a glove formed by using a composite material in which a rubber material as a base material contains particles of the piezoelectric ceramics.

In order to fully and clearly disclose the technology according to the appended claims, a characteristic embodiment is described above. However, the appended claims are not to be limited to the above embodiment but should be configured to embody, within the scope of the fundamentals shown herein, all possible variations and alternatives that may be created by a person skilled in the art.

In order for the electronic device 1 of the capacitive type according to the above embodiment to detect the touch performed in the water, the controller 5 is configured to detect, as the contact region, the region having the second capacitance smaller than the capacitance of the other region of the touch panel 3 or the region having the second capacitance (the capacitance generated between the touch panel 3 and the contact object) of the touch panel 3 equal to or smaller than the first predetermined value. However, the electronic device 1 according to the present embodiment may be characterized in that the controller 5 detects the first capacitance generated between a plurality of electrodes and detects, as the contact region, the region having the first capacitance larger than that of the other region of the touch panel 3, or the region having the first capacitance of the touch panel 3 equal to or larger than the predetermined value.

As described above, also, when the electronic device 1 according to the present embodiment is in the water, the second capacitance (the capacitance generated between the touch panel 3 and the contact object) uniformly increases across the touch panel 3 (as illustrate in FIG. 6, the region of the touch panel 3 exposed to the water has a maximum detection value, 100). Also, when a predetermined object made of the material having the relative permittivity lower than that of the water contacts, the second capacitance of the contact region decreases to be smaller than the capacitance of the other region and thus the contact may be detected. According to such a configuration, the electronic device 1 according to the present embodiment may be characterized in that the controller 5, based on the detection value of the touch panel 3 output from the touch panel controller 31, detects a change in the capacitance (any one of the first capacitance and the second capacitance described above) of the touch panel 3 and detects, as the contact region, the region having a change amount of the capacitance of the touch panel 3 equal to or smaller than the predetermined value, or the region having the change amount of the capacitance smaller than the change amount of the capacitance in the other region of the touch panel 3.

In the above embodiment, also, when the device of its own is not in the water, a position where the second capacitance increases is detected as the contact region and, on the other hand, when the device of its own is in the water, a position where the second capacitance decreases is detected as the contact region. According to such a configuration, in order for the electronic device 1 according to the present embodiment to enable the touch operation performed in the water, the controller 5 needs to be configured to determine whether the device of its own is in the water based on the detection value of the touch panel 3 output from the touch panel controller 31 and, when determining that the device of its own is shifted from the state in which the device of its own is not in the water to the state in which the device of its own is in the water, execute an operation to invert a positive/negative of the detection value of the touch panel 3. This operation may be executed by the touch panel controller 31 in place of the controller 5. In this case, the touch panel controller 31, when determining that the device of its own is shifted from the state in which the device of its own is not in the water to the state in which the device of its own is in the water, outputs a signal acquired by inverting the positive/negative of the detection value of the touch panel 3 to the controller 5. Thereby, the controller 5, regardless of whether the device of its own is in the water, may detect the contact with the touch panel 3 without executing a special operation.

Also, although in the above embodiment the controller 5 detects the capacitance (the second capacitance) generated between the touch panel 3 and the contact object and detects, as the contact region, the region having the second capacitance smaller than the capacitance of the other region of the touch panel 3 or the region having the second capacitance equal to or smaller than the predetermined value, such detections may be performed by the touch panel controller 31.

Although in the above embodiment the smartphone is described by way of example as the electronic device 1 having the touch panel 3, the electronic device 1 according to the present embodiment is not limited to the smartphone. The electronic device 1 may be, for example, a mobile phone, a tablet computer, a portable personal computer, a digital camera, a smart watch, a smart glass, a media player, an e-book reader, a navigator, a game machine, and the like. Or, the electronic device 1 may be a wearable device (a watch type, a glasses type, a cloth type, and the like) which may be directly or indirectly worn on the user's body. For example, the electronic device 1 may be provided to a (scuba) diving suit. In this case, the suit is provided with the touch sensor of the capacitive type which detects the contact by using the second detection method, thereby allowing a free operation of the electronic device 1 under the sea.

Although in the above embodiment the configuration and the operation of the electronic device 1 are described, the electronic device 1 is not limited thereto but may be configured as a method or a program having each of the constituents.

An electronic device according to one embodiment described below may be a terminal such as, for example, what is called a smartphone. However, the electronic device according to one embodiment is not limited to the smartphone. The electronic device according to one embodiment may be, for example, a feature phone, a laptop PC, a game terminal, a remote controller, and the like to which the user may perform an input operation. When the electronic device according to one embodiment is the smartphone, the electronic device may include, for example, the housing, the display, the touch panel, an operation button, and the like.

Figure 9:
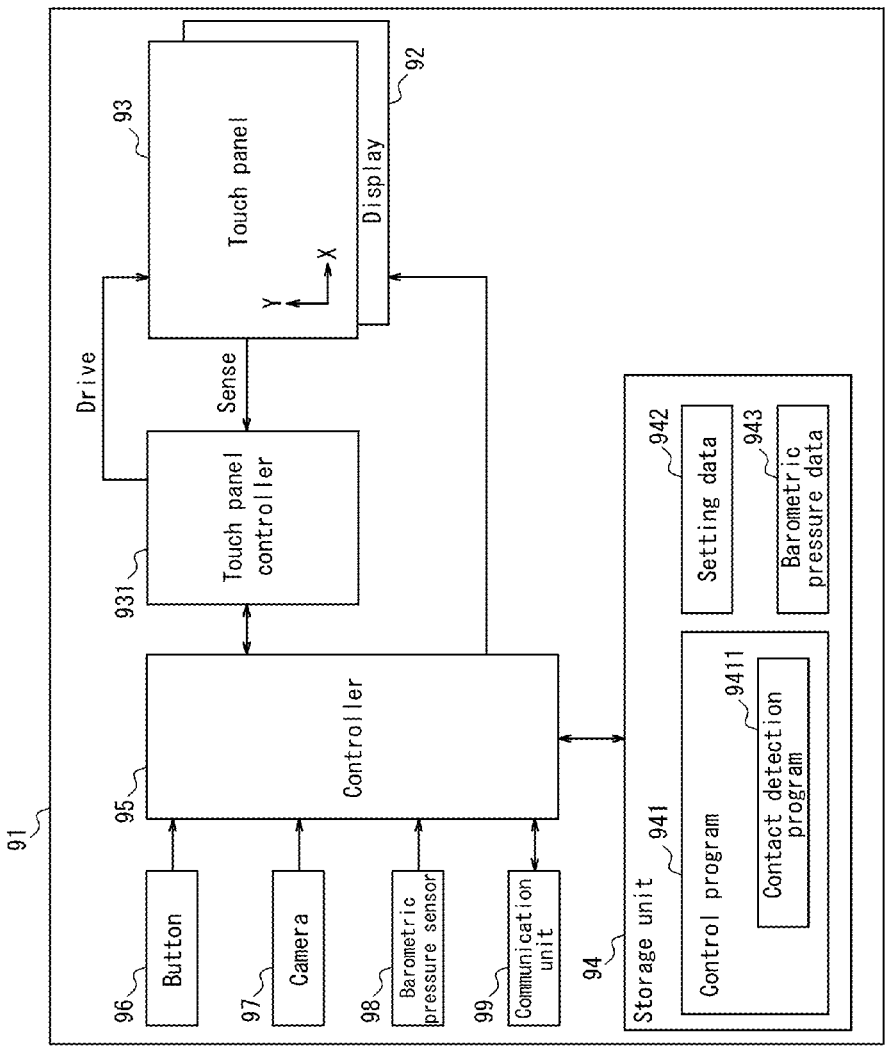
FIG. 9 is a block diagram of the electronic device.

FIG. 9 is a functional block diagram of the electronic device 91. As illustrated in FIG. 9, an electronic device 91 includes a display 92, a touch panel 93, a touch panel controller 931, a storage unit 94, a controller 95, a button 96, a camera 97, a barometric pressure sensor 98, and a communication unit 99.

The display 92 includes the display device such as the liquid crystal display (LCD: Liquid Crystal Display), the organic electroluminescence display (OELD: Organic Electro-Luminescence Display), the inorganic EL display (IELD: Inorganic Electro-Luminescence Display), or the like. The display 92 displays the characters, the images, the symbols, the shapes, and the like. The display 92 displays the characters, the images, the symbols, the shapes, and the like based on the image signal output from the controller 95.

Hereinafter, the touch panel 93 of the electronic device 91 according to the present embodiment is assumed to be of the capacitive type. The touch panel 93 has the X-axis line in which the transparent electrode groups disposed in a line in the X-axis direction are connected in series and the Y-axis line in which the transparent electrode groups disposed in a line in the Y-axis direction are connected in series. The touch panel 93 is provided with a plurality of X-axis lines arranged in parallel to one another in the Y-axis direction and a plurality of Y-axis lines arranged in parallel to one another in the X-axis direction. The plurality of X-axis lines and the plurality of Y-axis lines are connected to the touch panel controller 931.

Although in an example of FIG. 9 the display 92 and the touch panel 93 have substantially rectangular shapes, shapes of the display 92 and the touch panel 93 are not limited thereto. The display 92 and the touch panel 93 may have any shape including the square shape, the circular shape, the curved shape, and the like. Although in the example of FIG. 9 the display 92 and the touch panel 93 are disposed overlapping with each other, arrangements of the display 92 and the touch panel 93 are not limited thereto. For example, the display 92 and the touch panel 93 may be arranged side by side in such a manner that surfaces thereof do not overlap with each other, or the display 92 and the touch panel 93 may be arranged having a space therebetween. Although in the example of FIG. 9 a long side of the display 92 is parallel to a long side of the touch panel 93 while a short side of the display 92 is parallel to a short side of the touch panel 93, an overlapping manner of the display 92 and the touch panel 93 is not limited thereto. When the display 92 and the touch panel 93 are arranged overlapping with each other, for example, the display 92 may have one or a plurality of sides which are not parallel to any side of the touch panel 93.

The electronic device 91 determines the type of the gesture based on at least one of contact with the touch panel 93, the contact position, the change in the contact position, the number of times of the contact, and the intervals between a plurality of contacts (hereinafter, those may be collectively referred to as the contact mode).

The gestures is an operation performed to the touch panel 3. The gesture determined by the electronic device 91 includes, for example, touch, long touch, release, swipe, tap, double tap, long tap, flick, pinch-in, and pinch-out but is not limited thereto. The electronic device 1 executes the predetermined operation based on the determined gesture. Therefore, the intuitive and easy-to-use operation for the user may be substantialized.

The touch panel controller 931 periodically applies the driving voltage (Drive) to each of the Y-axis lines and detects (Scan) the potential at each of the X-axis lines. The potential detected here may be referred to as a detection value of the touch panel 93. The touch panel controller 931 outputs the potential detected at each position of the touch panel 93 (the detection value of the touch panel 93) to the controller 95.

The storage unit 94 may store the program and the data. The storage unit 94 may be used as the working area for temporarily storing a processing result of the controller 95. The storage unit 94 includes the recording medium. The recording medium may include the semiconductor recording medium and any non-transitory (non-transitory) storage media such as the magnetic storage medium. The storage unit 94 may include storage media of a plurality of types. The storage unit 94 may include the combination of the portable storage medium such as the memory card, the optical disk, the magneto-optical disk, and the like and the storage medium reader. The storage unit 94 may include the storage device used as the temporary storage region such as the RAM (Random Access Memory) and the like.

The storage unit 94 stores at least a control program 941 for providing functions of various controls to operate the electronic device 91, setting data 942, and barometric pressure data 943. The control program 941 includes a contact detection program 9411 for offering a function to detect a contact with the touch panel 93 based on the detection value of the touch panel 93. Also, the contact detection program 9411 offers a function to detect the type of the gesture performed to the touch panel 93 based on the contact mode to the touch panel 93. The control program 941 offers a function to perform, based on the gesture performed to the touch panel 93, various controls including changing information displayed in the display 92.

The controller 95 is the arithmetic processing device. The arithmetic processing device includes, for example, the CPU (Central Processing Unit), the SoC (System-on-a-chip), the MCU (Micro Control Unit), and the FPGA (Field-Programmable Gate Array) but is not limited thereto. The controller 95 controls overall operations of the electronic device 91 and thereby substantializing various functions.

For example, the controller 95, by referencing to the data stored in the storage unit 94 as necessary, executes instructions included in the program stored in the storage unit 94. Then, the controller 95 controls a functional unit in accordance with the data and the instruction, thereby substantializing various functions. The functional unit may include, for example, at least one of the display 92 and the communication unit 99 but is not limited thereto. Also, the controller 95 changes the control based on, for example, a detection result of the button 96, the camera 97, the barometric pressure sensor 98, and the like.

The button 96 is operated by the user. The controller 95, by cooperating with the button 96, detects an operation performed to the button 96. The operation performed to the button 96 includes, for example, pressing once and pressing a plurality of times but is not limited thereto.

The camera 97 is disposed, for example, on a surface of the electronic device 91 opposite to another surface having the display 92 disposed thereon and captures an object facing the surface. The camera 97 electronically captures an image by using the image sensor such as the CCD (Charge Coupled Device Image Sensor), the CMOS (Complementary Metal Oxide Semiconductor), and the like. Then, the camera 97 converts a captured image into the signal and transmits the signal to the controller 95.

The barometric pressure sensor 98 detects the barometric pressure (the atmospheric pressure) outside of the electronic device 91. Preferably, the barometric pressure sensor 98 is disposed in the housing of the electronic device 91. Also preferably, the electronic device 91 has a structure in which, through the opening which allows ventilation, the barometric pressure inside of the housing and the barometric pressure outside of the housing are linked to each other while holding back the fluid such as the water. With such a structure, the barometric pressure sensor 98 may detect the barometric pressure outside of the electronic device 91. The barometric pressure sensor 98 transmits a detection result to the controller 95.

The communication unit 99 may perform the radio communication. The communication unit 99 may support the short distance radio communication system. The short distance radio communication system includes the Bluetooth®, the wireless LAN (IEEE802.11), the ZigBee®, the infrared communication, the visible light communication, the NFC (Near Field Communication), and the like. The communication unit 99 may support a plurality of communication systems. The communication unit 99 may support, for example, the communication standard of the cellular phone such as 2G, 3G, and 4G. The communication unit 9 may support the wired communication. The wired communication includes, for example, the Ethernet®, the Fibre Channel, and the like.

Some of or all of the program and the data stored in the storage unit 94 in FIG. 9 may be downloaded from another device via the communication performed by the communication unit 99. Or, some of or all of the program and the data stored in the storage unit 94 in FIG. 9 may be stored in the non-transient storage medium readable by the reader included in the storage unit 94. Or, some or all of the program and the data stored in the storage unit 94 in FIG. 9 may be stored in the non-transient storage medium readable by a reader connected to a connector provided to the electronic device 91. The non-transient storage medium includes, for example, the optical disk such as the CD®, the DVD®, and the Blu-ray®, the magneto optical disk, the magnetic storage medium, the memory card, and the solid state storage medium but is not limited thereto.

FIG. 10 is a diagram illustrating an appearance of the electronic device 91 according to one embodiment. FIG. 11 are cross-sectional views taken from line A-A' of the electronic device 91 illustrated in FIG. 10.

FIG. 10 is a diagram illustrating a state of the electronic device 91 viewed in a direction opposite to the surface of the touch panel 93. That is, FIG. 10 illustrates the touch panel 93 viewed in the negative direction of the Z-axis, in a state in which the electronic device 91 (and the touch panel 93) is placed on a plane parallel to an X-Y plane. Note that in FIG. 10 the Z-axis is an axis orthogonal to the X-axis and the Y-axis illustrated in FIG. 10. Also, similarly to a standard right-handed (a system) three-dimensional orthogonal coordinate system, a direction facing a front side of FIG. 10 is considered as the positive direction of the Z-axis.

As illustrated in FIG. 10, the electronic device 91 includes a housing 1010 constituting an outer frame. Also, as illustrated in FIG. 11, the electronic device 91 includes the touch panel 93 on an upper side of the housing 1010 (on a positive direction side of the Z-axis). The electronic device 1 may include the display 92 on a rear side of the touch panel 93 (on a negative direction side of the Z-axis) in an overlapping manner.

The housing 1010 of the electronic device 1 according to one embodiment has the sealing structure. The housing 1010 forms a space therein which, with the sealing structure, prevents the water entering the space. The electronic device 91, in order to substantialize the sealing structure, closes the opening formed on the housing with the functional member which allows ventilation while preventing the fluid to pass therethrough, a cap, and the like. Such a functional member which allows ventilation while preventing the fluid to pass therethrough may be substantialized by using, for example, the Gore-Tex®, the Drytec, eVent, BERGTECH, HyventD, and the like. According to the present embodiment, the housing 1010 is provided with the touch panel 93. In this case, preferably, the electronic device 91 prevents the water from entering a gap between the housing 1010 and the touch panel 93 with the functional member or the like which allows ventilation while preventing the fluid to pass therethrough. Having the sealing structure, the electronic device 91 may be used in wet areas or in the water. According to the present embodiment, further, the housing 1010 may be provided with the button 96 constituted by using a mechanical switch. When the button 96 is provided, the electronic device 91, preferably, prevents the water from entering the gap between the housing 1010 and the touch panel 93 with the functional member or the like which allows ventilation while preventing the fluid to pass therethrough.

As illustrated in FIG. 10 and FIG. 11, the electronic device 91 has a contact member 12 above the touch panel 93 (in the positive direction of the Z-axis). The electronic device 91 illustrated in FIG. 10 includes a total of 12 contact members 12 including contact members 12a, 12b, and 12c. However, the number of the contact members 12 to be provided may be one or more of any number.

As illustrated in FIG. 10 and FIG. 11, also, each contact member 12, on either side thereof, has an elastic member 14 having appropriate elasticity. For example, for example, elastic members 14a and 14b are provided to both sides of the contact member 12a. Also, elastic members 14c and 14d are provided to respective sides of the contact member 12c. In an example illustrated in FIG. 10 and FIG. 11, each contact member 12 is provided with the elastic member 14 in a lateral direction (in the X-axis direction) alone. However, each contact member 12 may be provided with the elastic member 14 in a vertical direction (in the Y-axis direction) alone. Or, each contact member 12 may be provided with the elastic member 14 both in the lateral direction and in the vertical direction (in the X-axis direction and the Y-axis direction). The elastic member 14 may be made of a material such as, for example, rubber having appropriate elasticity.

Figure 11A:
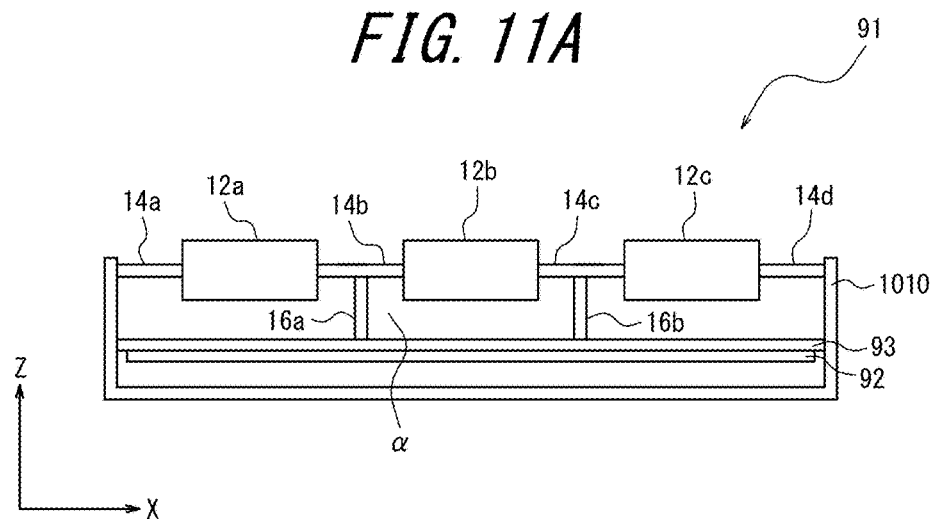
FIGS. 11A and 11B are cross-sectional views of the electronic device.

As illustrated in FIG. 11, each elastic member 14 is supported by the housing 1010 or a support 16. For example, the elastic member 14a is supported by a left-side inner wall of the housing 1010. The elastic member 14b is supported by a support 16a. The elastic member 14c is supported by a support 16b. The elastic member 14d is supported by a right-side inner wall of the housing 1010. Since each elastic member 14 is supported by the housing 1010 or the support 16, each contact member 12, as illustrated in FIG. 11A, is supported without contacting with the touch panel 93. In FIG. 10 and FIG. 11, the support 16 is designed to support each elastic member 14 provided between the contact members 12. However, the support 16 is not limited to such a design as illustrated in FIG. 10 and FIG. 11 but may be designed in any manner which allows each contact member 12 to be supported without contacting with the touch panel 93.

Figure 11B:
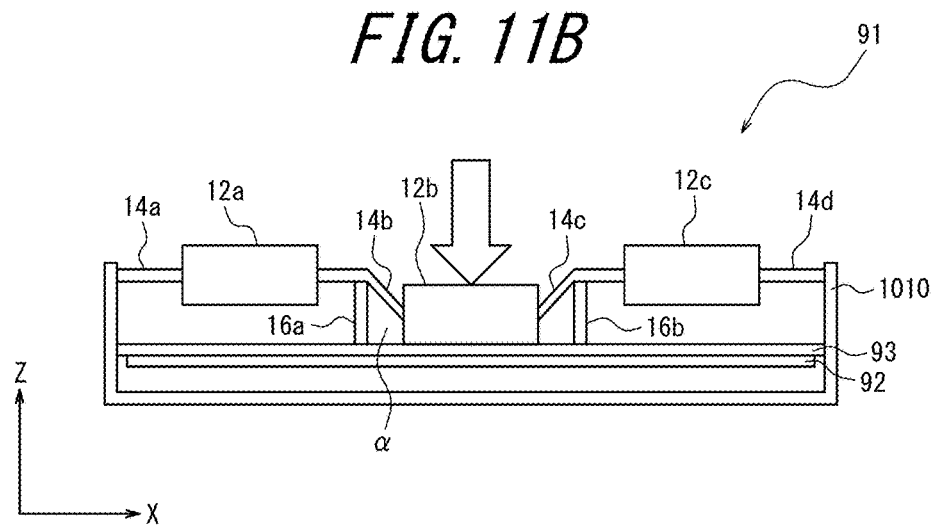

On the other hand, when each contact member 12 is pressed from above (in the negative direction of the Z-axis), the elastic member 14 stretches as illustrated in FIG. 11B, whereby each contact member 12 may contact with the touch panel 93. FIG. 11B illustrates, by way of example, a state in which the contact member 12b is pressed from above in the negative direction of the Z-axis (in a direction indicated by an arrow in FIG. 11B). Due to the pressure of this pressing, the elastic members 14b and 14c stretch causing a bottom surface of the contact member 12b to contact with an upper surface of the touch panel 93. Similarly, when the contact member 12a or 12c or another contact member 12 is pressed, the contact member 12 may contact with the upper surface of the touch panel 93. As described above, when the user presses the contact member 12 of the electronic device 91 with the finger or the like, the contact member 12 contacts with the touch panel 93. A portion of the contact member 12 to come into contact with the touch panel 93, i.e., a bottom surface of the contact member 12 is formed with a member having the relative permittivity lower than that of predetermined fluid such as the water. Here, the predetermined fluid means fluid covering the touch panel 93 or fluid in which the electronic device 91 is used. A portion of the contact member 12 other than the bottom surface may be made of any material such as, for example, rubber or plastic capable of retaining a shape.

The elastic member 14 has appropriate elasticity and thus applies restoring force to the contact member 12. Therefore, when the user reduces the pressing force of the finger or the like applied to the contact member 12, the contact member 12 stops contacting with the touch panel 93. For example, when the pressing is released from a state in which the contact member 12b is pressed as illustrated in FIG. 11B, the contact member 12b restores a state as illustrated in FIG. 11A in which the contact member 12b is not in contact with the upper surface of the touch panel 93. As described above, the contact member 12 may have the restoring force to restore the state in which the contact member 12 is not in contact with the touch panel 93 from the state in which the contact member 12 is in contact with the touch panel 93.

FIG. 10 and FIG. 11 illustrate a structure in which the elastic member 14 is placed between the contact members 12. However, the contact member 12 and the elastic member 14 are not limited to the structure illustrated in FIG. 10 and FIG. 11. For example, the contact member 12 and the elastic member 14 may be integrally formed, or constituted by using a single member which functions as both the contact member 12 and the elastic member 14.

As described above, since the housing 1010 of the electronic device 91 has the shielding structure, the water is prevented from entering the housing 1010. Especially, the electronic device 91 may prevent the water from entering the gap between the housing 1010 and the touch panel 93. Therefore, when the surface of the touch panel 93 of the electronic device 91 is covered with the water, or when the electronic device 91 in its entirety is submerged in the water, the water is prevented from entering the electronic device 91 through the gap between the housing 1010 and the touch panel 93.

When the fluid such as the water splashes the electronic device 91, or when the electronic device 91 in its entirety is submerged in the fluid such as the water, the surface of the touch panel 93 is covered with the water. That is, from a portion a (hereinafter, referred to as a fluid entering section a) and a portion communicating therewith as illustrated in FIG. 10 and FIG. 11, the fluid such as the water may enter freely. As described above, the electronic device 91 may be structured to allow the predetermined fluid such as, for example, the water to enter between the contact member 12 and the touch panel 93. When the fluid enters the fluid entering section a and the surface of the touch panel 93 is covered with the fluid, the electronic device 91 may prevent the water from entering the gap between the touch panel 93 and the housing 1010, i.e., from entering the electronic device 91.

When the electronic device 91 is operated in the fluid such as, for example, the water, as illustrated in FIG. 11A, the fluid such as the water presents between each contact member 12 and the touch panel 93. In this case, for example, the fluid such as the water presents between each of the contact members 12a, 12b, and 12c and the touch panel 93. In this state, when the user presses, for example, the contact member 12b, the bottom surface of the contact member 12b contacts with the upper surface of the touch panel 93 as illustrated in FIG. 11B. At this time, since the fluid such as the water between the contact member 12b and the touch panel 93 is pushed away by the contact member 12b, the fluid such as the water does not present (hardly presents) between the contact member 12b and the touch panel 93. Similarly, when the contact member 12a or 12c, or another contact member 12 is pressed, the fluid such as the water does not present (hardly presents) between the contact member 12 being pressed and the touch panel 93.

When a member such as a push button switch to be pushed down by pressing force is submerged in the fluid such as the water, the switch may possibly be turned on by a pressure of the water or the fluid applied to a surface of the switch. That is, there is a concern that, even when the user does not touch the push button switch, the push button switch may be turned on by itself. In order to avoid such an inconvenience, it is necessary to counteract the pressure of the water or the fluid applied to the switch by taking measures to require a heavy pressure or the like to turn the switch on. For example, it may be considered as the measures to strengthen a spring for giving the switch the recovery force. However, such measurements requires the heavy pressure to turn the switch on, increasing a burden on the user.

On the other hand, since the electronic device 91 according to the present embodiment allows the fluid such as the water to freely enter the fluid entering section a and the portion communicating therewith, the fluid such as the water presents between each contact member 12 and the touch panel 93. In the electronic device 91, therefore, the contact member 12 is prevented from coming into contact with the touch panel 93 by itself because of the pressure of the water or the fluid applied to the surface of each contact member 12. Accordingly, the electronic device 91 may avoid the inconvenience that the switch is turned on by itself despite that the user does not perform the operation.

When the electronic device 91 is operated in the fluid such as, for example, the water, the contact member 12 may be designed to have the restoring force smaller than the pressure of the fluid such as the water applied to the contact member 12. In this case, the contact member 12 may be designed to, by using the restoring force thereof, restore the state in which the contact member is not in contact with the touch panel 93 from the state in which the contact member is in contact with the touch panel 93. Thereby, the user is not required to apply the heavy pressure to the contact member to press the contact member, thereby avoiding the increase in the burden for the user. Or, in order for the contact member 12 to easily restore the state in which the contact member is not in contact with the touch panel 93 from the state in which the contact member is in contact with the touch panel 93, the portion of the contact member 12 to come into contact with the touch panel 93, i.e., the bottom surface of the contact member 12 may have a groove or the like which allows the fluid such as the water to enter the groove. Similarly, the portion of the contact member 12 to come into contact with the touch panel 93, i.e., the bottom surface of the contact member 12 may be formed having unevenness which allows the fluid such as the water to enter a recess of the unevenness.

According to the present embodiment, the controller 95 executes the contact detection program 411. When the program is executed, the controller 95, based on the detection value of the touch panel 93 output from the touch panel controller 931, detects the capacitance of the touch panel 93. The controller 95 detects the capacitance (hereinafter, also referred to as the first capacitance) between one transparent electrode (the first electrode) constituting the Y-axis line of the touch panel 93 and the other transparent electrode (the second electrode) constituting the X-axis line. The first capacitance is generated by the application of the driving voltage executed by the touch panel controller 931. Then, the controller 95, based on the first capacitance generated between the first electrode and the second electrode, calculates the capacitance (hereinafter, also referred to as the second capacitance) generated between the contact object such as the user's finger and the touch panel 93. Here, when the second capacitance generated between the touch panel 93 and the contact object increases, the first capacitance generated between the first electrode and the second electrode decreases. In other words, when the controller 95 detects larger first capacitance, the controller 95 simultaneously detects smaller second capacitance. The touch panel controller 931 outputs respective detection values corresponding to respective transparent electrodes of the touch panel 93. The controller 95, based on the respective detection value output from the touch panel controller 931, may detect, as the contact region, a region having the second capacitance larger than the capacitance of the other region of the touch panel 93. Or, the controller 95 may detect, as the contact region, a region of the touch panel 93 having the second capacitance equal to or larger than the predetermined value. The predetermined value may be determined based on a measurement value detected when the touch panel 93 is actually in contact with the contact object and a measurement value detected when the touch panel 93 is not in contact with the contact object.

As described above, the electronic device 91, by using the detection method of the capacitive type (especially, the projection-capacitive type) set forth above, may detect the contact with the touch panel 93 made by the contact object (the finger, the pen, the stylus pen, and the like). However, when the electronic device 91 is in the fluid such as, for example, the water, the first detection method cannot detect the contact with the touch panel 93 made by the contact object.

As such, in the electronic device 91 of the present embodiment, the controller 95 is configured to detect, in a manner different from the first detection method, a region (the first region) having the second capacitance smaller than the capacitance of the other region of the touch panel 93 as the contact region. Alternatively, in the electronic device 91 of the present embodiment, the controller 95 may be configured to detect, as the contact region of the contact object, a region (the first region) of the touch panel 93 having the second capacitance equal to or smaller than the predetermined value. The predetermined value also may be determined based on the measurement value detected when the touch panel 93 is actually in contact with the contact object and the measurement value detected when the touch panel 93 is not in contact with the contact object. Hereinafter, a detection method having such a configuration is referred to as the second detection method.

An electronic device, by employing the first detection method and, based on an increase in the second capacitance due to the contact with the touch panel made by the predetermined object having high relative permittivity (i.e., easily performs the capacitive coupling with the touch panel), may detect the position having the increased second capacitance as the contact position. When such an electronic device is, for example, in the water and the entire surface of the touch panel 93 is exposed to the water, the second capacitance at each position of the touch panel 93 uniformly increases due to the capacitance coupling with the water. Therefore, when the predetermined object having high relative permittivity contacts with the touch panel in the water, the increase in the second capacitance caused by the contact may not be detected. In this case, therefore, the conventional electronic device cannot detect the contact position of the touch panel.

On the other hand, the electronic device 91 according to the present embodiment, by using the second detection method described above, may detect the contact region of the touch panel 93. As described above, the water is unlikely to contact with the contact region where the touch panel 93 and the predetermined object are in contact with each other. Therefore, when the predetermined object made of a material having the relative permittivity lower than that of, for example, the water ($\varepsilon r=80.4$) is brought into contact with the touch panel 93 in the water, a region which is unlikely to cause the capacitance coupling between the touch panel 93 and the water in comparison to the other region may be generated. Accordingly, the electronic device 91 may detect, as the contact region, the region (the first region) having the second capacitance smaller than the capacitance of the other region of the touch panel 93. Or, the electronic device 91 may detect, as the contact region, the region (the first region) of the touch panel 93 having the second capacitance equal to or smaller than the predetermined value. That is, the electronic device 91 according to the present embodiment has the second detection method as described above and therefore, even when the electronic device 91 is of the capacitive type, allows the touch operation in the water.

The controller 95, based on the contact mode detected by the first detection method or the second detection method, may detect the type of the gesture performed to the touch panel 93. The controller 95, by executing the control program 941, based on the type of the gesture performed to the touch panel 93, may execute various controls including changing the information displayed in the display 92. Note that the electronic device 91 according to the present embodiment may have the second detection method alone without the first detection method, i.e., may allow the touch operation in the fluid such as the water alone.

As described above, the electronic device 91, by using the second detection method, allows the touch operation in the water when the predetermined object made of the material having the relative permittivity lower than that of the water ($\varepsilon r=80.4$) contacts with the touch panel 93. Therefore, the electronic device 91 according to the present embodiment, when the predetermined object is the contact member 12 described above, may detect the contact with the touch panel 93 made by each contact member 12. In order to allow the touch operation of the electronic device 91 in the water, for example, each contact member 12 is designed to have a portion to come into contact with the touch panel 93 having the relative permittivity lower than that of the water ($\varepsilon r=80.4$).

We conducted an experiment by bringing the contact member 12 including the material having the relative permittivity lower than that of water ($\varepsilon r=80.4$) into contact with the touch panel 93 of the electronic device 91 in the water and, from a result of the experiment, found that the touch operation is allowed in the water. In this experiment, the portion of the contact member 12 to come into contact with the touch panel 93 was formed with the member made of rubber as the material having the relative permittivity lower than that of the water. The material of the portion of the contact member 12 to come into contact with the touch panel 93 is not limited to the material such as rubber but may be any material so long as having the relative permittivity lower than that of the water.

Figure 12:
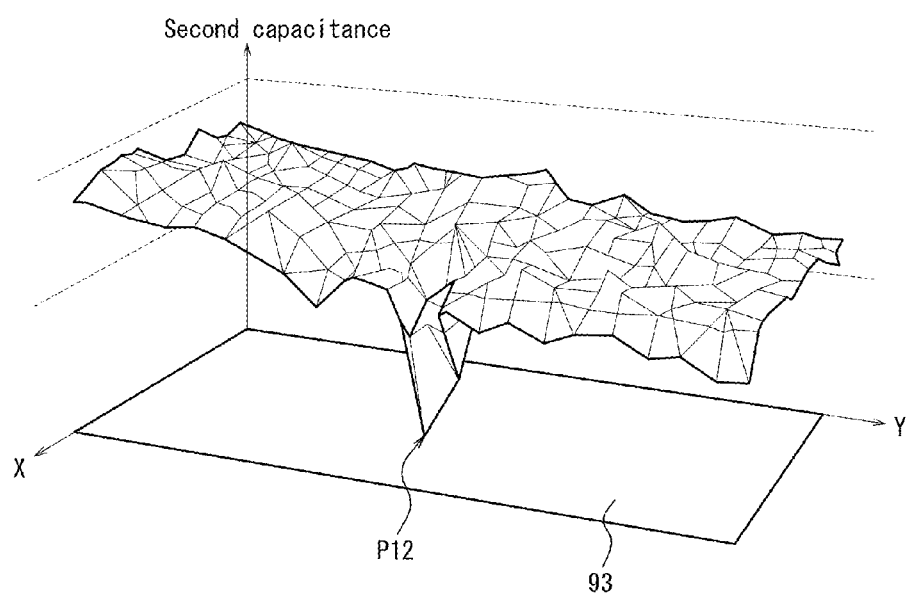
FIG. 12 is a diagram illustrating the distribution of the capacitance when the electronic device is operated in the water.

FIG. 12 is a diagram illustrating a distribution of magnitude of the second capacitance detected when the touch operation is performed in the water. The distribution of the second capacitance when the contact member 12 contacts with the touch panel 93 under the condition as described above is as illustrated in FIG. 12, in which a peak position P12 having the capacitance smaller than that of the other region was observed. FIG. 12, by way of example, illustrates the distribution of the second capacitance detected when the contact member 12 arranged in the vicinity of the center of the touch panel 93 is pressed and thus contacts with the touch panel 93. As illustrated in FIG. 12, at the position where the contact member 12 contacts with the touch panel 93, the peak P12 having lower second capacitance was detected. Also, at most of positions where the contact member 12 is not in contact with the touch panel 93, higher second capacitance was detected.

As described above, it was confirmed that a difference between the second capacitance at the peak position P12 and the second capacitance in the other region is large enough to allow distinguishing the peak position from the other region. By using this method, accordingly, it was found that the touch operation performed in the water may be detected. The region where the contact member 12 made of rubber contacts with the touch panel 93 is a region in which the water is unlikely to contact with and, simultaneously, unlikely to have the capacitive coupling with an experimenter's finger. In this region, when the driving voltage is applied by the touch panel controller 931, surface charges formed on the touch panel 93 are unlikely to disperse in the water.

When the touch operation is performed to the touch panel in the atmosphere by using a normal electronic device, a substance (for example, the finger) having the relative permittivity higher than that of the air contacts with the touch panel. In this case, the capacitive coupling occurs between the finger and the touch panel at the contact position, increasing the second capacitance to be larger than that of the other region where the finger is not in contact with the touch panel. Based on such a phenomenon, the normal electronic device may detect the contact position (the first detection method). That is, the first detection method detects an upper peak (in a direction opposite to the peak P12) in FIG. 12 as the contact position. Therefore, it should be understood that the detection of the first detection method is completely different from the detection of the second detection method performed with the configuration of the electronic device 91 according to the present embodiment.

Figure 13:
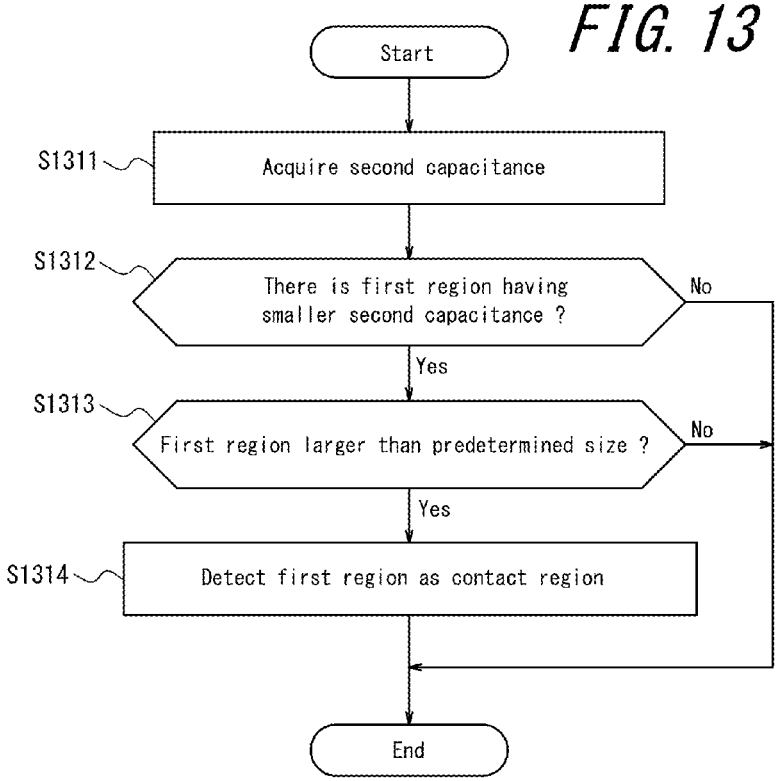
FIG. 13 is a flowchart illustrating an example of an operation of the electronic device.

Next, referring to FIG. 13, a function executed by the electronic device 91 will be described. FIG. 13 is a flowchart illustrating an example of an operation executed by the electronic device 91 according to the present embodiment. The electronic device 91, by controlling the controller 95 to execute the control program 941 stored in the storage unit 4, may execute the operation illustrated in FIG. 13.

When the operation illustrated in FIG. 13 starts, the controller 95 of the electronic device 91, based on the detection vale of the touch panel 93 output from the touch panel controller 931, acquires the second capacitance corresponding to each position of the touch panel 93 (step S1311). Here, the second capacitance, as described above, is the capacitance generated between the touch panel 93 and the contact object (the contact member 12).

After acquiring the second capacitance at step S1311, the controller 95 determines whether there is the region (the first region) having the second capacitance smaller than the capacitance of the other region of the touch panel 93 (step S1312). The controller 95, when determining at step 1312 that the first region does not present (No), ends the operation illustrated in FIG. 13. On the other hand, the controller 95, when determining at step S1312 that there is the first region (Yes), proceeds to step S1313.

At step S1313, the controller 95 determines whether the first region is larger than the predetermined size. Here, the predetermined size may be approximately in size (for example, 5 mm square) allowing the determination that the contact member 12 as the contact object contacts with the touch panel 93.

When the controller 95 determines at step S1313 that the first region is smaller than the predetermined size (No), the controller 95 does not detect the first region as the contact region (i.e., invalidates the detection of the first region) and ends the operation. On the other hand, when he controller 95 determines at step S1313 that the first region is larger than the predetermined size (Yes), the controller 95 detects the first region as the contact region generated by the contact member 12 in contact with the touch panel 93 (step S1314).

The controller 95, based on the detection of the contact made by the contact member 12, determines the type of the gesture on the basis of the contact mode and, in accordance with the gesture, executes a predetermined operation. For example, the controller 95 may determine whether the user quickly pushes, or pushes and holds, the contact member 12. Or, for example, the controller 95 may determine whether the user presses the contact member 12 once, or twice in succession like double-click. The controller 95 executes the predetermined operation and then ends the operation.

As described above, in the electronic device 91 according to the present embodiment, the controller 95 determines, as the contact region, the region of the touch panel 93 having the capacitance smaller than that of the other region. In this case, when the contact member 12 contacts with the touch panel 93, the capacitance of the region of the contact decreases to be smaller than the capacitance of the other region.

Note that in the example illustrated in FIG. 13 the controller 95 is configured to detect, as the first region, the region having the second capacitance smaller than the capacitance of the other region of the touch panel 93. However, the controller 95 is not limited to such a configuration but may be configured to detect, as the first region, the region having the second capacitance equal to or smaller than the predetermined value. The predetermined value may be determined based on the measurement value detected when the contact member 12 is actually in contact with the touch panel 93 and the measurement value detected when the contact member 12 is not in contact with the touch panel 93.

As described above, in the electronic device 91 according to the present embodiment, the controller 95 may determine, as the contact region, the region of the touch panel 93 having the capacitance equal to or smaller than the predetermined value. In this case, when the contact member 12 contacts with the touch panel 93, the capacitance of the contact region becomes equal to or smaller than the predetermined value.

Or, the modes described above may be combined. That is, the controller 95 may determine, as the contact region, the region having the second capacitance smaller than the capacitance of the other region of the touch panel 93 and, simultaneously, equal to or smaller than the predetermined value. As described above, in the electronic device 91 according to the present embodiment, the controller 95 may determine, as the contact region, the region of the touch panel 93 having the capacitance equal to or smaller than the predetermined value and, simultaneously, smaller than the capacitance of the other region. In this case, when the contact member 12 contacts with the touch panel 93, the capacitance of the contact region becomes equal to or smaller than the predetermined value and, simultaneously, smaller than the capacitance of the other region.

As described above, in the electronic device 91 according to the present embodiment, when the contact member 12 contacts with the touch panel 93, the capacitance of the contact region decreases to be smaller than that of the other region. Or, the capacitance of the contact region becomes equal to or smaller than the predetermined value. Therefore, the electronic device 91 according to the present embodiment may be characterized in including at least the touch panel 93 of the capacitive type, the member (the contact member 12) having the portion to come into contact with the touch panel 93 with the relative permittivity lower than that of the fluid, and the controller 95 for detecting the contact of the contact member 12 based on the change in the capacitance of the touch panel 93 caused by the contact member 12 in contact with the touch panel 93.

As described above, in the electronic device 91 according to the present embodiment, the controller 95 may determine that the first region detected smaller than the predetermined size is not the contact region of the contact member 12 but the first region larger than the predetermined size is the contact region of the contact member 12.

In the water there are numerous electric charges in a state in which the electric charges are capable of moving freely. Therefore, when such electric charges come close to a surface of the touch panel 93 of the electronic device 91, a localized region may be formed in which the first capacitance is considered to have increased due to the electric charges. Since the region in which the first capacitance increases is a region in which the second capacitance decreases, such a localized region may be erroneously detected as the contact region by the second detection method. Therefore, preferably, the first region detected smaller than the predetermined size is determined as not the contact region, and the first region larger than the predetermined size is detected as the contact region. Thereby, erroneous detection of the contact region based on the change in the second capacitance caused by the electric charges freely moving in the water may be prevented.

As described above, the electronic device 91 according to the present embodiment, when the touch panel 93 is covered with the water, or when the body of the electronic device 91 is in the water, may detect the contact by using the touch panel 93. Therefore, the electronic device 91 according to the present embodiment may expand the usage thereof.

In the embodiment described above, the electronic device 91 is assumed to be used in the fluid such as, for example, the water. However, the electronic device 91 may be configured on the assumption to be used under a predetermined situation.

The control program 941 stored in the storage unit 4 of the electronic device 91 may offer a function to determine whether the electronic device 91 (the device of its own) is under the predetermined situation. The control program 941, by referring to the setting data 942, based on the detection value of the touch panel 93, may determine whether the electronic device 91 is under the predetermined situation. In this case, the setting data 942 may include condition data allowing for presuming whether the electronic device 91 is under the predetermined situation based on the distribution of the capacitance of the touch panel 93 detected based on the detection value of the touch panel 93. Or, the setting data 942 may include, as the condition data, the detection value of the touch panel 93 which allows the presuming that the electronic device 91 is under the predetermined situation and the detection value of the touch panel 93 which allows the presuming that the electronic device 91 is not under the predetermined situation. Or, the setting data 942 may include, as the condition data, a changing condition of the detection value of the touch panel 93 which allows the presuming that the electronic device 91 is shifted from a state in which the electronic device 91 is not under the predetermined situation to a state in which the electronic device 91 is under the predetermined situation. Similarly, the setting data 942 may include, as the condition data, the changing condition of the detection value of the touch panel 93 which allows the presuming that the electronic device 91 is shifted from the state in which the electronic device 91 is under the predetermined situation to the state in which the electronic device 91 is not under the predetermined situation.

Figure 14:
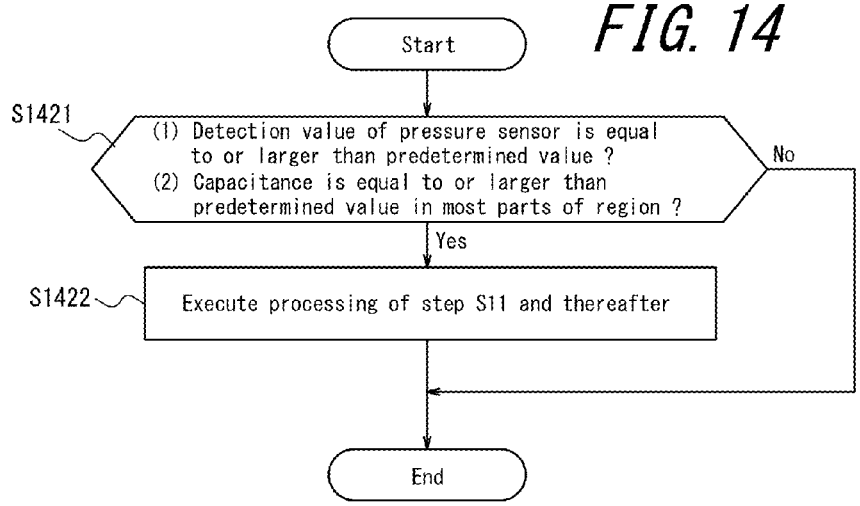
FIG. 14 is a flowchart illustrating another example of the operation of the electronic device.

Also, the control program 941 may refer to the barometric pressure data 943 as the setting data 942. By referring to the barometric pressure data 943, the controller 95 may determine, based on the detection value of the pressure sensor, whether the electronic device 91 is under the predetermined situation. In this case, by using the barometric pressure sensor 8 in the electronic device 91 as the pressure sensor, a value of a pressure applied to the electronic device 91 from outside thereof may be detected. For example, as illustrated in FIG. 14, for example, the controller 95 may determine, first, whether the detection value of the pressure sensor in the electronic device 91 is, for example, equal to or higher than a predetermined value ((1) of step S1421). Then, when the detection value of the pressure sensor is equal to or higher than the predetermined value at step S1421, the controller 95 may execute processing of step S1311 and thereafter in the flowchart illustrated in FIG. 13 (step S1422).

Here, the predetermined value of the detection value of the pressure sensor may be a value which allows distinguishing from the condition under which the electronic device 91 is in the atmosphere. In this case, the barometric pressure data 943 includes information about a relation between the detection result of the pressure sensor and the state of the electronic device 91. The barometric pressure data 943 stores information about the relation between the detection result of the pressure sensor and the state whether the electronic device 91 is under the predetermined situation, those preliminarily detected by an experiment, simulation, and the like.

Or, the control program 941 may refer to data of the second capacitance as the setting data 942. By referring to the data of the second capacitance, the controller 95 may determine, based on the detection value of the touch panel 93, whether the electronic device 91 is under the predetermined situation.

For example, as illustrated in FIG. 14, for example, the controller 95 may determine, first, whether the detection value of the touch panel 93 (the second capacitance) is equal to or higher than the predetermined value in most parts of the region ((2) of step S1421). As described with reference to FIG. 12, when the electronic device 91 is in predetermined fluid such as, for example, the water, the detection value (the second capacitance) of the touch panel 93 increases in most parts of the region. Then, at step S1421, when the detection value of the touch panel 93 is, for example, equal to or higher than the predetermined value, the controller 95 may execute processing of step S1311 and thereafter in the flowchart illustrated in FIG. 13 (step S1422).

Here, the predetermined value of the detection value of the touch panel 93 may be a value which allows distinguishing from the condition under which the electronic device 91 is in the atmosphere. In this case, the data of the second capacitance includes information about a relation between the detection result of the touch panel 93 and the condition of the electronic device 91. The data of the second capacitance stores information about the relation between a detection result of the detection value of the touch panel 93 and the state whether the electronic device 91 is under the predetermined situation, those preliminarily detected by an experiment, simulation, and the like.

Further, the controller 95, at step S1421 illustrated in FIG. 14, based on both conditions (1) and (2), may determine whether to perform processing at step S1422.

In this way, the electronic device 91 may determine whether the device of its own is under the predetermined situation. For example, as the "predetermined situation", the electronic device 91 may determine whether the touch panel 93 of the electronic device 91 is covered with the fluid such as the water, or whether the body of the electronic device 91 is in the fluid such as the water.

Although in the embodiment described above the electronic device 91 detects contact of the contact object by using the mutual capacitance method of the projection-capacitance type, the detection method is not limited thereto but may be the self-capacitance method or the dual method combining the self-capacitance method and the mutual capacitance method.

Figure 15:
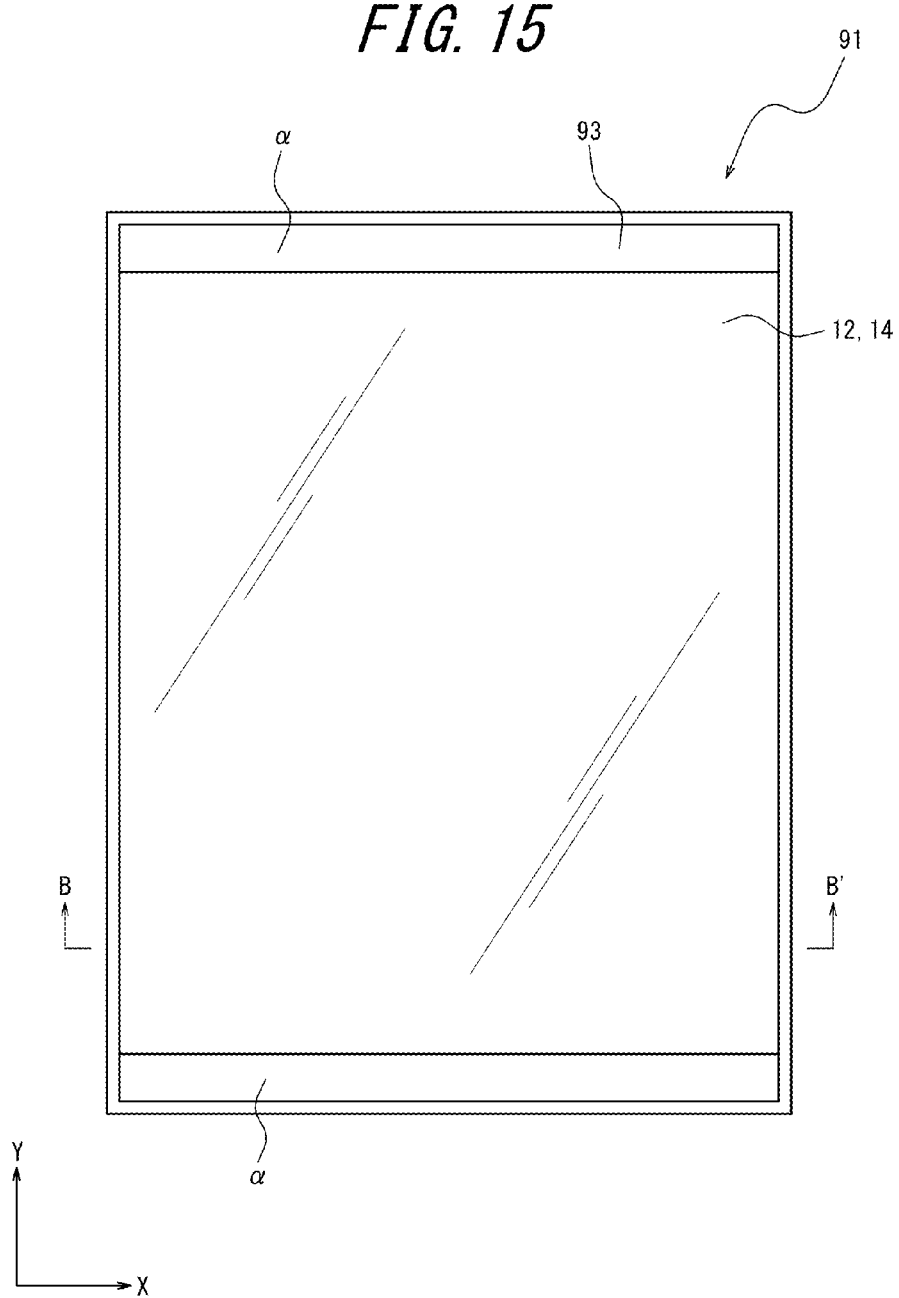
FIG. 15 is an external view of an electronic device of another embodiment.

FIG. 15 is a diagram illustrating appearance of the electronic device 91 according to another example of the present embodiment. FIG. 16 are cross-sectional views of the electronic device 91 taken from line B-B' of FIG. 15. Hereinafter, features different from those described with reference to FIG. 10 and FIG. 11 will be described, appropriately simplifying or omitting overlapping descriptions.

In the example illustrated in FIG. 10 and FIG. 11, the electronic device 91 includes any number of contact members 12. As illustrated in FIG. 15 and FIG. 16, in the electronic device 91 in the another example of the present embodiment, the contact member 12 and the elastic member 14 illustrated in FIG. 10 and FIG. 11 are constituted by using one sheet-like member. Hereinafter, the contact member 12 and the elastic member 14 constituted by using one sheet-like member in this manner will be collectively referred to as "contact members 12 and 14".

The contact members 12 and 14, in order to function as the elastic member 14, may be formed with a member having appropriate elasticity such as, for example, rubber. Also, the contact members 12 and 14, in order to function as the contact member 12, a portion of the contact members 12 and 14 to come into contact with the touch panel 93, i.e., a bottom portion thereof is formed with a member having the relative permittivity lower than that of the predetermined fluid such as, for example, the water.

Figure 16A:
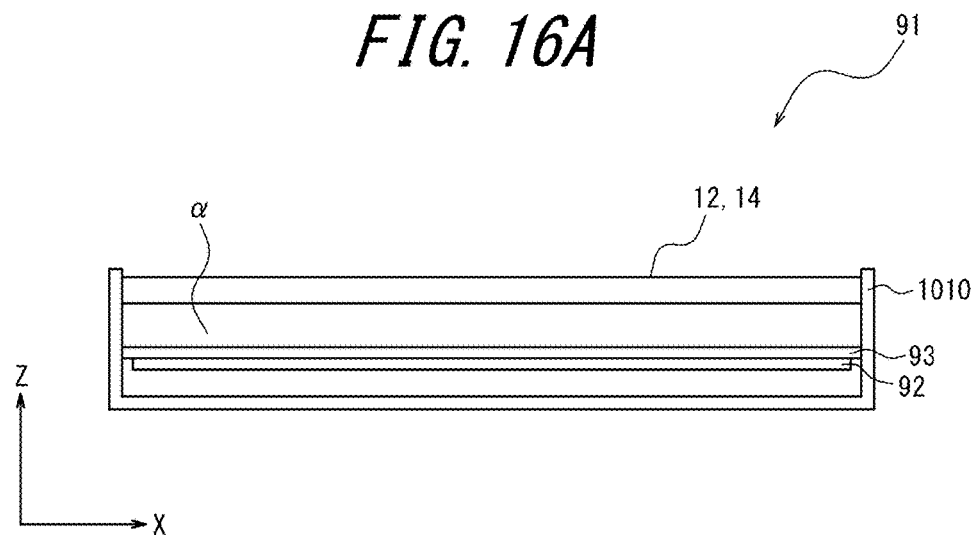
FIGS. 16A and 16B are cross-sectional views of the electronic device of the another embodiment.

As illustrated in FIG. 16, the contact members 12 and 14 are supported by the housing 1010. For example, a left end of the contact members 12 and 14 is supported by a left-side inner wall of the housing 1010. Also, a right end of the contact members 12 and 14 is supported by a right-side inner wall of the housing 1010. Since both ends of the contact members 12 and 14 are supported by the housing 1010, the contact members 12 and 14, as illustrated in FIG. 16A, are supported in a state in which the contact members 12 and 14 are not in contact with the touch panel 93. In the example illustrated in FIG. 15 and FIG. 16, the contact members 12 and 14 are supported by the housing 1010 in the lateral direction (in the X-axis direction) alone. However, the contact members 12 and 14 may be supported by the housing 1010 in the vertical direction (in the Y-axis direction) alone. Or, the contact members 12 and 14 may be supported by the housing 1010 both in the lateral direction and in the vertical direction (in the X-axis direction and in the Y-axis direction).

Figure 16B:
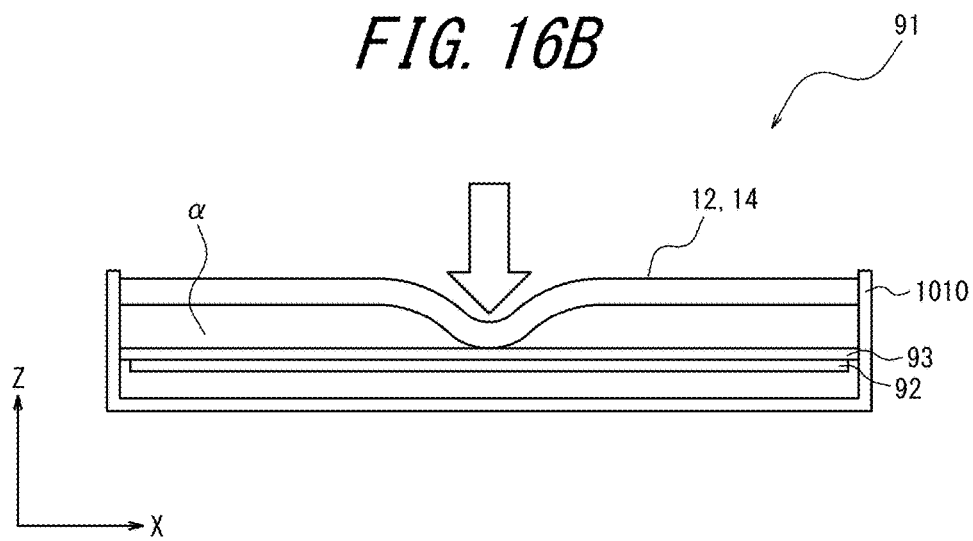

On the other hand, when the contact members 12 and 14 are pressed from above (in the negative direction of the Z-axis), the contact members 12 and 14 itself stretches as illustrated in FIG. 16B and thus may contact with the touch panel 93. FIG. 16B illustrates, by way of example, a state in which a central portion of the contact members 12 and 14 is pressed from above in the negative direction of the Z-axis (in a direction indicated by an arrow illustrated in FIG. 16B). The contact members 12 and 14 stretch due to the pressure, and the bottom surface thereof touches an upper surface of the touch panel 93. As described above, when the user presses the contact members 12 and 14 of the electronic device 91 with the finger or the like, at a pressed position the contact members 12 and 14 contacts with the touch panel 93.

Also, the contact members 12 and 14 are designed to have appropriate elasticity and thus have the restoring force. Accordingly, when the user reduces the pressure applied with the finger or the like to the contact members 12 and 14 of the electronic device 91, the contact members 12 and 14 stop contacting with the touch panel 93. For example, in a state in which the contact members 12 and 14 are pressed as illustrated in FIG. 16B, when the pressing is released, the contact members 12 and 14, as illustrated in FIG. 16A, restores the state in which the contact members 12 and 14 are not in contact with the upper surface of the touch panel 93. As described above, the contact member 12 and 14 may be designed to have the restoring force to restore the state in which the contact members 12 and 14 are not in contact with the touch panel 93 from the state in which the contact members 12 and 14 are in contact with the touch panel 93.

When the fluid such as the water splashes the electronic device 91, or when the electronic device 91 in its entirety is submerged in the fluid such as the water, the surface of the touch panel 93 is covered with the water. That is, the fluid such as the water may freely enter the fluid entering section a and the portion communicating therewith as illustrated in FIG. 15 and FIG. 16. As described above, the electronic device 91 may be structured to allow the predetermined fluid such as, for example, the water to enter between the contact members 12 and 14 and the touch panel 93. In FIG. 15 and FIG. 16, an upper end and a lower end of the touch panel 93, i.e., either end of the touch panel 93 in a longitudinal direction thereof has the fluid entering section a. However, the fluid entering section a may be formed at any position of the contact members 12 and 14 positioned over the touch panel 93. Also, the number of fluid entering sections a may be one or more of any number.

When the electronic device 91 is operated in the fluid such as, for example, the water, as illustrated in FIG. 16A, the fluid such as the water presents between the contact members 12 and 14 and the touch panel 93. In this state, when the user presses, for example, the contact members 12 and 14, as illustrated in FIG. 16B, the bottom surface of the contact members 12 and 14 contacts with the upper surface of the touch panel 93. At this time, since the fluid such as the water between the contact members 12 and 14 and the touch panel 93 is pushed away by the contact members 12 and 14, the fluid does not present (hardly presents) between the contact members 12 and 14 and the touch panel 93.

In such an electronic device 91, also, since the fluid such as the water freely enters the fluid entering section a and the portion communicating therewith, the fluid such as the water presents between the contact members 12 and 14 and the touch panel 93. In the electronic device 91, therefore, the pressure of the water or the fluid applied to the surface of the contact members 12 and 14 prevents the contact members 12 and 14 from contacting with the touch panel 93 by itself. Therefore, the electronic device 91 also may avoid the inconvenience to be turned on despite that the user does not perform the operation.

In the electronic device 91 illustrated in FIG. 10, FIG. 11, FIG. 15, and FIG. 16, each of the contact member 12 and the contact members 12 and 14 may be of an attachment type removably attached to the body of the electronic device 91. Thereby, in the situation that the electronic device 91 is not in the fluid such as the water, in a manner similar to the touch panel of the normal electronic device, the user may operate the electronic device 91 with the finger or the like and, also in the situation that the electronic device 91 is in the fluid such as the water, the user may operate the electronic device 91.

In order to fully and clearly disclose the technology according to the appended claims, a characteristic embodiment is described above. However, the appended claims are not to be limited to the above embodiment but should be configured to embody, within the scope of the fundamentals shown herein, all possible variations and alternatives that may be created by a person skilled in the art.

In order for the electronic device 91 according to the above embodiment of the capacitive type to detect the touch performed in the water, the controller 95 is configured to detect, as the contact region, the region having the second capacitance smaller than the capacitance of the other region of the touch panel 93. Alternatively, or in combination of such a configuration, the controller 95 configured to detect, as the contact region, the region of the touch panel 93 having the second capacitance (the capacitance generated between the touch panel 93 and the contact object) equal to or smaller than the predetermined value is illustrated. However, in the electronic device 91 according to the present embodiment, the controller 95 may detect the first capacitance generated between a plurality of electrodes. In this case, the electronic device 91 may be characterized in detecting, as the contact region, the region having the first capacitance larger than the capacitance of the other region of the touch panel 93, or the region of the touch panel 93 having the first capacitance equal to or larger than the predetermined value.

Also, as described above, when the electronic device 91 according to the present embodiment is in the water, the second capacitance (the capacitance generated between the touch panel 93 and the contact object) uniformly increases across the touch panel 93. For example, the second capacitance of the region of the touch panel 93 exposed to the water has a maximum detection value. In the present embodiment, therefore, the predetermined object made of a material having relative permittivity lower than that of the water comes into contact in order to reduce the second capacitance of the contact region to be smaller than the capacitance of the other region, thereby enabling the detection of the contact. According to such a configuration, in the electronic device 91 according to the present embodiment, the controller 95, based on the detection value of the touch panel 93 output from the touch panel controller 931, may detect a change in the capacitance of the touch panel 93. Here, the change in the capacitance of the touch panel 93 may be any one of the first capacitance and the second capacitance described above. Also, the present embodiment may be characterized in detecting, as the contact region, the region of the touch panel 93 having a change amount of the capacitance equal to or smaller than the predetermined value, or the region having the change amount of the capacitance smaller than that of the other region of the touch panel 93.

In the present embodiment described above, also, when the device of its own is not in the water, the position where the second capacitance increases may be detected as the contact region. On the other hand, in the present embodiment described above, when the device of its own is in the water, for example, the position where the second capacitance decreases is detected as the contact region. According to such a configuration, in order to enable the touch operation to the electronic device 91 of the present embodiment, the controller 95 may determine whether the device of its own is in the water based on the detection value of the touch panel 93 output from the touch panel controller 931. When determining that the device of its own is shifted from the state in which the device of its own is not in the water to the state in which the device of its own is in the water, the controller 95 needs to be configured to execute the operation to invert the positive/negative of the detection value of the touch panel 93. Also, this operation may be executed by the touch panel controller 931 in place of the controller 95. In this case, the touch panel controller 931, when determining that the device of its own is shifted from the state in which the device of its own is not in the water to the state in which the device of its own is in the water, outputs the signal acquired by inverting the positive/negative of the detection value of the touch panel 93 to the controller 95. Thereby, the controller 95, regardless of whether the device of its own is in the water, or without executing a special operation, may detect the contact with the touch panel 93.

In the present embodiment described above, also, the controller 95 is configured to detect the capacitance (the second capacitance) generated between the touch panel 93 and the contact object. In the above embodiment, further, the region having the second capacitance smaller than the capacitance of the other region of the touch panel 93, or the region of the touch panel 93 having the second capacitance equal to or smaller than the predetermined value is detected as the contact region. According to one embodiment, however, such detection may be performed by the touch panel controller 931.

Although in the above embodiment the smartphone is described by way of example as the electronic device 91 having the touch panel 93, the electronic device 91 according to the present embodiment is not limited to the smartphone. The electronic device 91 may be, for example, the mobile phone, the tablet computer, the portable personal computer, the digital camera, the smart watch, the smart glass, the media player, the e-book reader, the navigator, the game machine, and the like. Or, the electronic device 91 may be the wearable device (the watch type, the glasses type, the cloth type, and the like) which may be directly or indirectly worn on the user's body. For example, the electronic device 91 may be provided to the (scuba) diving suit. In this case, the suit is provided with the touch sensor of the capacitive type which detects the contact by using the second detection method, thereby allowing a free operation of the electronic device 91 under the sea.

Although in the above embodiment the configuration and the operation of the electronic device 91 are described, the embodiment is not limited thereto but may be configured as a method or a program having each of the constituents. For example, the control program is used such that the electronic device having the touch panel of the capacitive type and the controller detects, based on the detection value of the touch panel, the capacitance generated between the touch panel and the contact object and detects, as the contact region of the contact object, the first region having the capacitance smaller than that of the other region of the touch panel.

What is claimed is:

1. An electronic device comprising:
   a touch panel of a capacitive type;
   a member coupled with the touch panel, and including a portion to come into contact with the touch panel, the portion has a first relative permittivity that is lower than relative permittivity of fluid;
   a housing that covers both of the touch panel and the member; and
   a controller configured to determine a region of the touch panel as a contact region of the portion of the member coupled with the touch panel, the determined region has capacitance that is smaller than capacitance of regions other than the determined region, of the touch panel.

2. The electronic device according to claim 1, wherein when the member comes into contact with the touch panel, the capacitance of the determined region becomes smaller than the capacitance of the regions other than the determined region, of the touch panel.

3. The electronic device according to claim 1, wherein the fluid may enter between the member and the touch panel.

4. The electronic device according to claim 1, wherein the member has restoring force to restore a state in which the member is not in contact with the touch panel from a state in which the member is in contact with the touch panel.

5. The electronic device according to claim 4, wherein the member has the restoring force smaller than a pressure received from the fluid and, by using the restoring force, restores the state in which the member is not in contact with the touch panel from the state in which the member is in contact with the touch panel.

6. An electronic device comprising:
   a touch panel of a capacitive type;
   a member coupled with the touch panel, and including a portion to come into contact with the touch panel, the portion has a relative permittivity that is lower than relative permittivity of fluid;
   a housing that covers both of the touch panel and the member; and
   a controller configured to determine a region of the touch panel as a contact region of the portion of the member coupled with the touch panel, the determined region has capacitance that is equal to or smaller than a predetermined value.

7. The electronic device according to claim 6, wherein when the member comes into contact with the touch panel, the capacitance of the determined region becomes equal to or smaller than the predetermined value.

8. An electronic device comprising:
a touch panel of a capacitive type;
a member coupled with the touch panel, and including a portion to come into contact with the touch panel, the portion has a relative permittivity that is lower than relative permittivity of fluid;
a housing that covers both of the touch panel and the member; and
a controller configured to determine a region of the touch panel as a contact region of the portion of the member coupled with the touch panel, the determined region has capacitance that is equal to or smaller than a predetermined value and also is smaller than capacitance of regions other than the determined region, of the touch panel.

9. The electronic device according to claim 8, wherein when the member comes into contact with the touch panel, the capacitance of the determined region becomes equal to or smaller than the predetermined value and also becomes smaller than the capacitance of the regions other than the determined region, of the touch panel.

* * * * *